(12) United States Patent
Iyasu et al.

(10) Patent No.: US 11,916,494 B2
(45) Date of Patent: Feb. 27, 2024

(54) CONTROLLER FOR DC TO AC CONVERSION DEVICE FOR REDUCING DISTORTING OF OUTPUT CURRENT

(71) Applicant: DENSO CORPORATION, Kariya (JP)

(72) Inventors: Seiji Iyasu, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 17/369,483

(22) Filed: Jul. 7, 2021

(65) Prior Publication Data

US 2021/0359622 A1 Nov. 18, 2021

Related U.S. Application Data

(63) Continuation of application No. PCT/JP2019/049765, filed on Dec. 19, 2019.

(30) Foreign Application Priority Data

Jan. 7, 2019 (JP) ................................. 2019-000842

(51) Int. Cl.
*H02M 7/5387* (2007.01)
*H02M 1/12* (2006.01)
*H02M 1/00* (2006.01)

(52) U.S. Cl.
CPC ....... *H02M 7/53871* (2013.01); *H02M 1/007* (2021.05); *H02M 1/0025* (2021.05); *H02M 1/12* (2013.01)

(58) Field of Classification Search
CPC ...... H02M 1/0025; H02M 1/12; H02M 1/007; H02M 7/537; H02M 7/53871; H02M 7/53875; H02M 7/5387
See application file for complete search history.

(56) References Cited

U.S. PATENT DOCUMENTS

| | | | | |
|---|---|---|---|---|
| 5,912,813 A | * | 6/1999 | Kerkman | H02M 7/53875 318/811 |
| 8,785,816 B2 | * | 7/2014 | Kooken | B23K 9/1043 219/130.1 |
| 10,355,620 B2 | * | 7/2019 | Ayai | H02M 1/126 |

(Continued)

FOREIGN PATENT DOCUMENTS

JP 2015-198460 A 11/2015

*Primary Examiner* — Gustavo A Rosario-Benitez
(74) *Attorney, Agent, or Firm* — Oliff PLC

(57) ABSTRACT

A controller includes first and second setting sections. The first setting section sets a first duty-cycle, which is a percentage of a switch-on time period of a drive switch in one switching-cycle, by peak current-mode control to control a reactor current to be a current-command value generated based on an AC-voltage value. The second setting section sets a second duty-cycle, which is the percentage of the switch-on time period of the drive switch in one switching-cycle, by average-current-mode control to control an average value of the reactor current to be the current-command value. The controller operates the drive switch at the first duty-cycle when an absolute value of the AC-voltage value is equal to or more than a threshold less than an amplitude of the AC-voltage value, and operates the drive switch at the second duty-cycle when the absolute value of the AC-voltage value is less than the threshold.

7 Claims, 14 Drawing Sheets

(56) References Cited

U.S. PATENT DOCUMENTS

| | | | | |
|---|---|---|---|---|
| 2006/0171182 A1* | 8/2006 | Siri | ............. | H02M 3/33592 |
| | | | | 363/131 |
| 2009/0196072 A1* | 8/2009 | Ye | ............. | H02M 7/493 |
| | | | | 363/17 |
| 2012/0201064 A1* | 8/2012 | Asakura | ............. | H02M 3/155 |
| | | | | 363/98 |
| 2016/0268890 A1* | 9/2016 | Ayai | ............. | H02M 7/48 |
| 2016/0329829 A1* | 11/2016 | Ayai | ............. | H02M 7/5387 |
| 2017/0033696 A1* | 2/2017 | Handa | ............. | H02M 3/33584 |
| 2017/0133921 A1* | 5/2017 | Okumura | ............. | H02M 7/49 |
| 2018/0212520 A1* | 7/2018 | Zhang | ............. | H02M 7/5387 |
| 2019/0334455 A1* | 10/2019 | Morito | ............. | H02M 1/08 |

\* cited by examiner

CONTROLLER FOR DC TO AC CONVERSION DEVICE FOR REDUCING DISTORTING OF OUTPUT CURRENT

CROSS-REFERENCE TO RELATED APPLICATION

The present application is based on and claims the benefit of priority from earlier Japanese Patent Application No. 2019-000842 filed Jan. 7, 2019, the description of which is incorporated herein by reference.

BACKGROUND

Technical Field

The present disclosure relates to a controller applicable to a DC to AC conversion device that converts DC voltage to AC voltage.

Related Art

A controller is disclosed which operates a drive switch of an AC to DC conversion device by known peak current mode control to control a reactor current that flows through a reactor in the AC to DC conversion device to be equal to a current command value.

SUMMARY

As an aspect of the present disclosure, a controller for a DC to AC conversion device is provided. The controller is applicable to a DC to AC conversion device, which includes a reactor and a drive switch, converts DC voltage supplied through an input terminal to AC voltage, and supplies the converted AC voltage to an AC source connected to an output terminal.

The controller includes:
- a current acquisition section that acquires a reactor current, the reactor current being a value of current flowing through the reactor;
- an AC voltage acquisition section that acquires an AC voltage value, the AC voltage value being a voltage value of the AC source;
- a first setting section, the first setting section setting a first duty cycle, which is a percentage of a switch-on time period of the drive switch in one switching cycle, by peak current mode control to control the acquired reactor current to be equal to a current command value generated based on the acquired AC voltage value;
- a second setting section, the second setting section setting a second duty cycle, which is the percentage of the switch-on time period of the drive switch in one switching cycle, by average current mode control to control an average of the acquired reactor current to be equal to the current command value; and
- an operating section that operates the drive switch at the first duty cycle set by the first setting section when an absolute value of the acquired AC voltage value is equal to or more than a voltage threshold value which is less than an amplitude of the acquired AC voltage value, and operates the drive switch at the second duty cycle set by the second setting section when the absolute value of the acquired AC voltage value is less than the voltage threshold value.

DETAILED DESCRIPTION OF THE PREFERRED EMBODIMENTS

Japanese Laid-Open Patent Publication No. 2015-198460 discloses a controller that operates a drive switch of an AC to DC conversion device by known peak current mode control to control a reactor current that flows through a reactor in the AC to DC conversion device to be equal to a current command value. The controller reduces distortion of an output current by adding a correction value that changes in accordance with the phase of the AC voltage to the current command value. The correction value is calculated on the basis of a divergence width between the average value of reactor currents and the command value.

It is desirable to improve the power factor of the AC power to be supplied to an AC power source by reducing the distortion of output voltage also in a DC to AC power conversion device that converts DC voltage to AC voltage.

The present disclosure has been accomplished in view of the above problem and aims at providing a controller for a DC to AC (DC/AC) conversion device that inhibits or reduces distortion of an output current.

First Embodiment

A DC to AC conversion device (hereinafter, referred to as a power conversion device) according to the present embodiment will be described. The power conversion device converts DC power supplied through DC terminals to AC power and supplies the AC power to an AC source.

Figure 1:
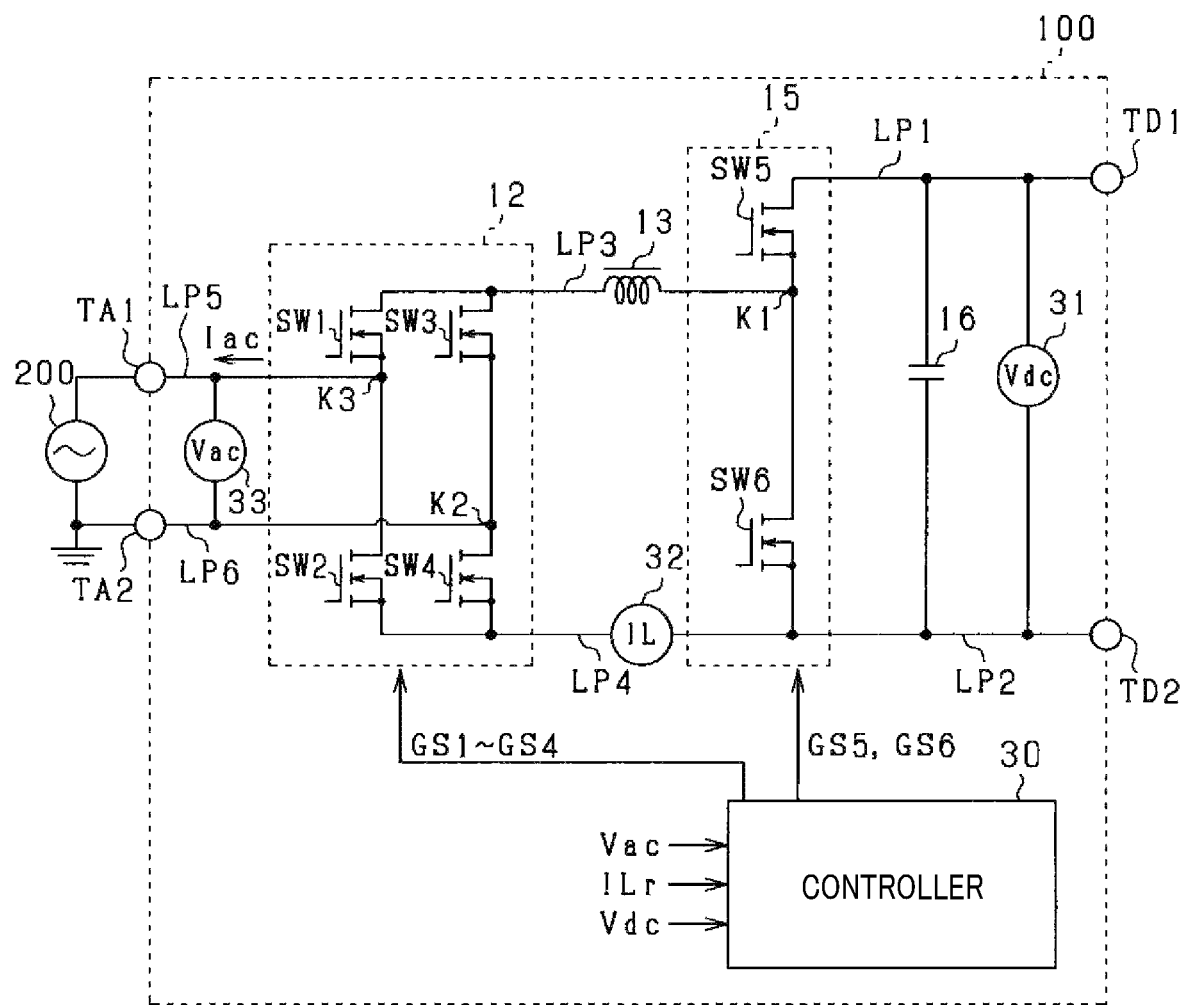
FIG. 1 is a diagram of a power conversion device according to a first embodiment.

A power conversion device 100 shown in FIG. 1 includes first and second DC terminals TD1 and TD2 to which a non-illustrated DC power source is connected and first and second AC terminals TA1 and TA2 to which an AC power source 200 is connected. The AC power source 200 is, for example, a commercial power source, and the DC power source is a battery or a DC to DC conversion circuit.

The power conversion device 100 includes a capacitor 16, a half-bridge circuit 15, a reactor 13, a full-bridge circuit 12, and first to sixth lines LP1 to LP6.

To the first DC terminal TD1 is connected a first end of the first line LP1, and to the second DC terminal TD2 is connected a first end of the second line LP2. The first line LP1 and the second line LP2 are connected to each other with the capacitor 16.

The half-bridge circuit 15 is connected to second ends of the first and second lines LP1 and LP2. The half-bridge circuit 15 includes a fifth switch SW5 and a sixth switch SW6. The fifth and sixth switches SW5 and SW6 are voltage-driven switches and are N-channel MOSFETs in the present embodiment. The source of the fifth switch SW5 is connected to the drain of the sixth switch SW6. The drain of the fifth switch SW5 is connected to the first line LP1, and the source of the sixth switch SW6 is connected to the second line LP2. The fifth and sixth switches SW5 and SW6 each include a parasitic diode that are connected in inverse parallel. In the present embodiment, the fifth switch SW5 corresponds to a drive switch.

The half-bridge circuit 15 and the full-bridge circuit 12 are connected to each other through the third line LP3 and the fourth line LP4. A first end of the third line LP3 is connected to a first contact point K1 between the source of the fifth switch SW5 and the drain of the sixth switch SW6. The third line LP3 is provided with the reactor 13. A first end of the fourth line LP4 is connected to the source of the sixth switch SW6. A second end of each of the third and fourth lines LP3 and LP4 is connected to the full-bridge circuit 12.

The full-bridge circuit 12 includes first to fourth switches SW1 to SW4. The first to fourth switches SW1 to SW4 are voltage-driven switches and are N-channel MOSFETs in the present embodiment. The source of the third switch SW3 and the drain of the fourth switch SW4 are connected to each other. The source of the first switch SW1 and the drain of the second switch SW2 are connected to each other. The drains of the first and third switches SW1 and SW3 are connected to the third line LP3, and the sources of the second and fourth switches SW2 and SW4 are connected to the fourth line LP4.

A second contact point K2 between the source of the third switch SW3 and the drain of the fourth switch SW4 is connected to a first end of the sixth line LP6, and a second end of the sixth line LP6 is connected to the second AC terminal TA2. A third contact point K3 between the first switch SW1 and the second switch SW2 is connected to a first end of the fifth line LP5, and a second end of the fifth line LP5 is connected to the first AC terminal TA1.

The power conversion device 100 includes a first voltage sensor 31, a current sensor 32, and a second voltage sensor 33. The first voltage sensor 31 detects a voltage value of the DC power source input through the first and second DC terminals TD1 and TD2 as an input voltage Vdc. The current sensor 32 is provided to the fourth line LP4 and detects a current value that flows through the reactor 13 as a reactor current ILr. The second voltage sensor 33 detects a voltage value of the AC power source 200 as an AC voltage Vac.

The power conversion device 100 includes a controller 30. The controller 30 switches on and off the first to sixth switches SW1 to SW6. Note that, functions provided by the controller 30 may be provided by, for example, software stored in a tangible memory device and a computer, hardware, or a combination thereof that executes the software.

Figure 2:
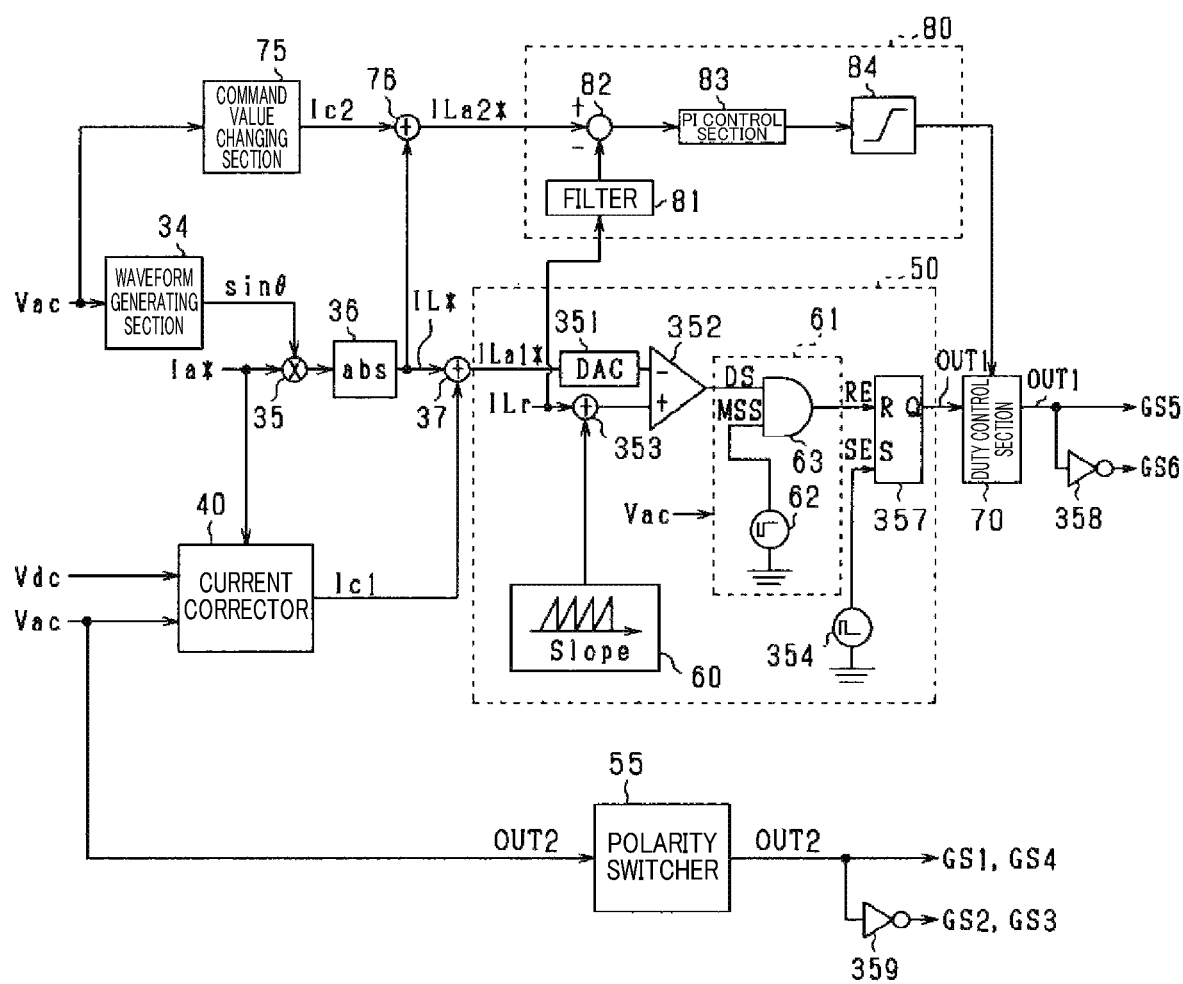
FIG. 2 is a functional block diagram of a controller.

FIG. 2 is a functional block diagram of the controller 30. The controller 30 switches on and off the fifth and sixth switches SW5 and SW6 by known peak current mode control. The controller 30 includes a waveform generating section 34, a multiplier 35, an absolute value calculator 36, an adder 37, a current corrector 40, a first setting section 50, a duty control section 70, and a polarity switcher 55. In the present embodiment, the controller 30 includes a current acquisition section and an AC voltage acquisition section.

The waveform generating section 34 generates a reference waveform $\sin \theta$ of the AC voltage Vac. The reference waveform $\sin \theta$ is a value indicating the change in the AC voltage Vac per half-cycle (T/2), has an amplitude of 1, and fluctuates by the same cycle as the AC voltage Vac. In the present embodiment, the reference waveform $\sin \theta$ has the same phase as the AC voltage Vac. The waveform generating section 34 detects the point in time at which the AC voltage Vac detected by the second voltage sensor 33 becomes zero, as a zero-crossing point in time, and sets the time period during which the AC voltage Vac changes from the zero-crossing point in time to a next zero-crossing point in time, as the half-cycle (T/2) of the AC voltage Vac.

The multiplier 35 multiplies an amplitude command value $Ia^*$ of the reactor current ILr by the reference waveform $\sin \theta$. The amplitude command value $Ia^*$ is a command value that determines the amplitude of the reactor current ILr. The absolute value calculator 36 sets the absolute value of the output value from the multiplier 35 as an uncorrected command current $IL^*$.

To inhibit or reduce the distortion of an output current Iac, the current corrector 40 sets a first correction value Ic1 to be added to the uncorrected command current $IL^*$. The details of the current corrector 40 will be discussed below. The adder 37 adds the first correction value Ic1 to the uncorrected command current $IL^*$ and sets the value after the addition as the current command value, which is a first command current $ILa1^*$.

The first setting section 50 outputs a fifth gate signal GS5, which operates the fifth switch SW5, and a sixth gate signal GS6, which operates the sixth switch SW6, on the basis of the reactor current ILr detected by the current sensor 32 and the first command current $ILa1^*$. In the present embodiment, the first setting section 50 outputs the fifth and sixth gate signals GS5 and GS6 by the known peak current mode control. Hereinafter, the percentage of a switch-on time period Ton of the fifth switch SW5 to one switching cycle Tsw, which is the percentage set by the first setting section 50, will be referred to as a first duty cycle D1.

The first setting section 50 includes a digital-to-analog converter 351, a comparator 352, an adder 353, an RS flip-flop 357, a slope compensator 60, and a mask time setting section 61. The first command current $ILa1^*$ is input to the digital-to-analog converter 351. The digital-to-analog converter 351 converts the input first command current $ILa1^*$ from a digital value to an analog value. The first command current $ILa1^*$ converted to the analog value is input to an inverted input terminal of the comparator 352. The adder 353 adds up the reactor current ILr and a slope compensating signal Slope set by the slope compensator 60 and outputs the reactor current ILr that has been compensated. The output from the adder 353 is input to a non-inverted input terminal of the comparator 352. Note that, the slope compensating signal Slope inhibits or reduces oscillation that is caused by the fluctuation of the current flowing through the reactor 13.

The comparator 352 compares the first command current ILa1* with the reactor current ILr and inputs a determination signal DS in a low state to the mask time setting section 61 during the time period in which the reactor current ILr is less than the first command current ILa1*. Furthermore, the comparator 352 inputs a determination signal DS in a high state to the mask time setting section 61 during the time period in which the reactor current ILr is more than the first command current ILa1*.

In a case in which the determination signal DS is brought into the high state before the mask time elapses during one switching cycle Tsw of the fifth switch SW5, the mask time setting section 61 outputs a reset signal RE in the high state after the mask time elapses, and in a case in which the determination signal DS is brought into the high state after the mask time has elapsed, the mask time setting section 61 outputs the reset signal RE in the high state upon receipt of the determination signal DS in the high state. The mask time is the minimum time of the switch-on time period Ton determined by the first duty cycle D1 and one switching cycle Tsw. The reset signal RE is a signal that determines a termination point in time of the switch-on time period Ton in one switching cycle Tsw of the fifth switch SW5.

The mask time setting section 61 includes a pulse generating section 62 and an AND circuit 63. The pulse generating section 62 generates a mask signal MSS for setting the mask time. In the present embodiment, the length of the time period in which the mask signal MSS is brought into the low state in one cycle of the mask signal MSS corresponds to the mask time. In the present embodiment, one cycle of the mask signal MSS is the same as one switching cycle Tsw of the fifth switch SW5.

The AND circuit 63 includes a first input terminal that receives the mask signal MSS from the pulse generating section 62 and a second input terminal that receives the determination signal DS from the comparator 352. In a case in which the determination signal DS is in the high state during the time period in which the mask signal MSS is in the high state, the AND circuit 63 outputs the reset signal RE in the high state. In contrast, during the time period in which the mask signal MSS is in the low state (that is, during the mask time TM), the AND circuit 63 outputs the reset signal RE in the low state even if the determination signal DS is in the high state.

The RS flip-flop 357 includes an S terminal that receives a set signal SE from a clock 354. The RS flip-flop 357 includes a Q terminal connected to the gate of the fifth switch SW5 through the duty control section 70. A first output signal OUT1 that is output from the Q terminal to the gate of the fifth switch SW5 through the duty control section 70 serves as the fifth gate signal GS5, which switches on and off the fifth switch SW5.

When the first duty cycle D1 set by the first setting section 50 is more than an upper limit value DM, the duty control section 70 limits the time period during which the first output signal OUT1 is brought into the high state to the length corresponding to the upper limit value DM. The first output signal OUT1 output from the duty control section 70 is input to an inverter 358. The inverter 358 inverts the logic of the first output signal OUT1 and outputs the signal. The signal output from the inverter 358 to the gate of the sixth switch SW6 serves as the sixth gate signal GS6. The sixth gate signal GS6 is a value obtained by inverting the fifth gate signal GS5.

The polarity switcher 55 inverts a second output signal OUT2 in accordance with the polarity of the AC voltage Vac. Upon determining that the polarity of the AC voltage Vac is a positive polarity, the polarity switcher 55 outputs the second output signal OUT2 in the high state. In contrast, upon determining that the polarity of the AC voltage Vac is a negative polarity, the polarity switcher 55 outputs the second output signal OUT2 in the low state.

The second output signal OUT2 output from the polarity switcher 55 is input to the gates of the first and fourth switches SW1 and SW4. The second output signal OUT2 output from the output terminal of the polarity switcher 55 to the gates of the first and fourth switches SW1 and SW4 will be first and fourth gate signals GS1 and GS4. The output terminal of the polarity switcher 55 is also connected to the gates of second and third switches SW2 and SW3 via an inverter 359. The signal obtained by inverting the logic of the second output signal OUT2 by the inverter 359 will be second and third gate signals GS2 and GS3. The second and third gate signals GS2 and GS3 take inverted values of the first and fourth gate signals GS1 and GS4.

Figure 3:
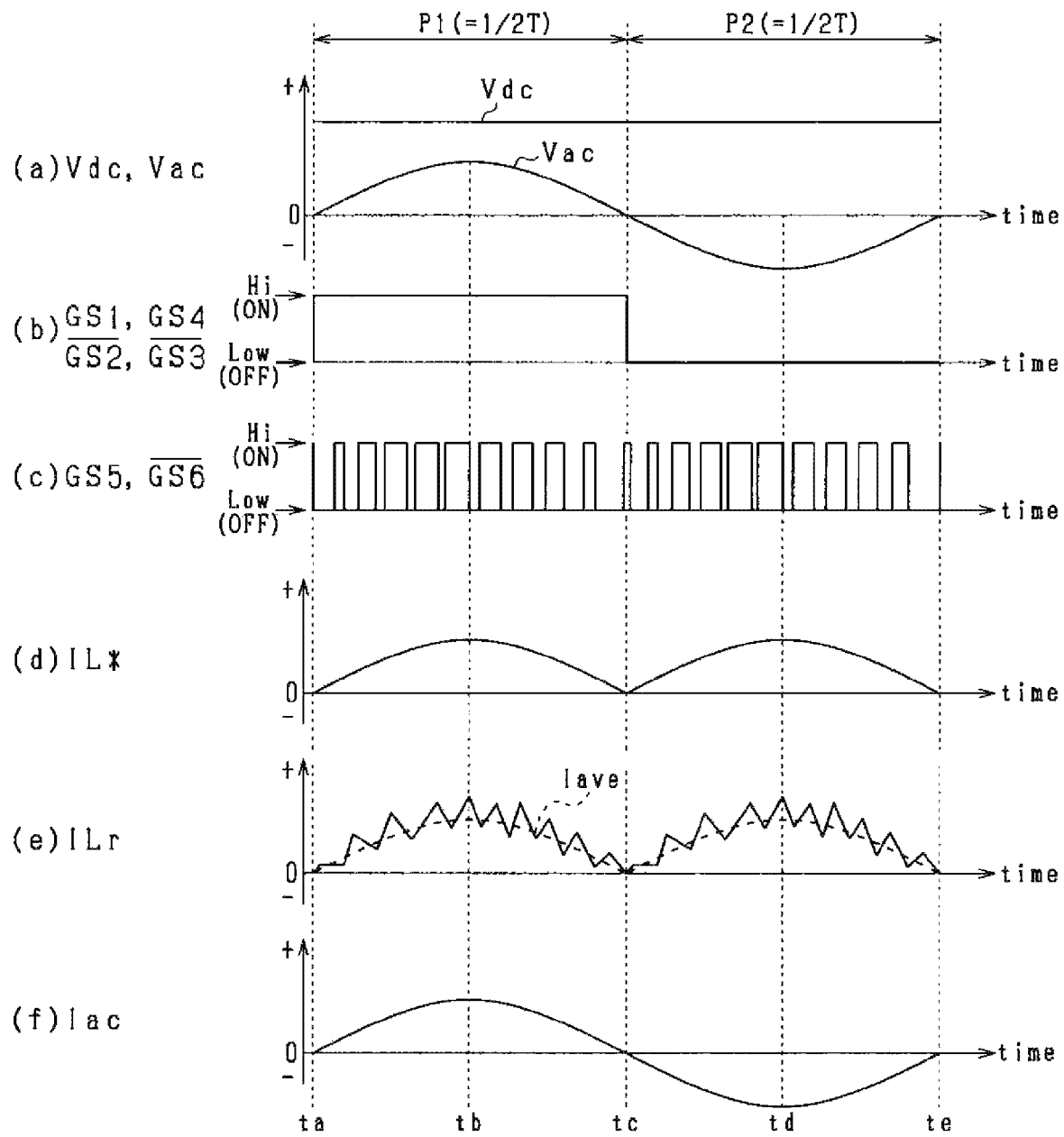
FIG. 3 is a timing diagram illustrating operation of the power conversion device.

Next, operation of the power conversion device 100 will be described. FIG. 3 is a timing diagram of the power conversion device 100. FIG. 3(a) shows changes in the AC voltage Vac and the input voltage Vdc. FIG. 3(b) shows changes in the first and fourth gate signals GS1 and GS4 and the inverted values of the second and third gate signals GS2 and GS3. FIG. 3(c) shows changes in the fifth gate signal GS5 and the inverted value of the sixth gate signal GS6. FIG. 3(d) shows changes in the first command current ILa1*. FIG. 3(e) shows changes in the reactor current ILr. FIG. 3(f) shows changes in the output current Iac. In FIG. 3, the points in time ta, tc, and te are zero-crossing points in time at which the AC voltage Vac becomes zero in one cycle T of the AC voltage Vac. More specifically, the points in time ta and te are zero up-crossing points in time at which the AC voltage Vac switches from a negative value to a positive value, and the point in time tc is a zero down-crossing point in time at which the AC voltage Vac switches from a positive value to a negative value. The point in time tb is a positive peak point in time in one cycle T of the AC voltage Vac. The point in time td is a negative peak point in time of one cycle T of the AC voltage Vac. The peak point in time is a point in time at which the AC voltage Vac takes a positive maximum value or a negative minimum value in one cycle T of the AC voltage Vac.

To improve the power factor of the AC power to be supplied to the AC power source 200, the controller 30 calculates the first command current ILa1* on the basis of the AC voltage Vac. Thus, the first command current ILa1* has a waveform that repeats the positive half-wave of the sine wave every half cycle T. In FIG. 3, the first command current ILa1* increases from the zero-crossing points in time ta and tc of the AC voltage Vac to the peak points in time tb and td of the AC voltage Vac. The first command current ILa1* decreases from the peak points in time tb and td to the zero-crossing points in time tc and te of the AC voltage Vac.

In a first time period P1 in which the AC voltage Vac is positive in one cycle T of the AC voltage Vac, the first and fourth gate signals GS1 and GS4 are in the high state, and the second and third gate signals GS2 and GS3 are in the low state. Thus, in the full-bridge circuit 12, the first and fourth switches SW1 and SW4 are switched on, and the second and third switches SW2 and SW3 are switched off. In the first time period P1, the controller 30 sets the first duty cycle D1 in order to control the reactor current ILr to be equal to the command current by the peak current mode control performed in the first time period P1. At this time, the reactor current ILr in one switching cycle Tsw takes a value corresponding to the first duty cycle D1. Thus, the average value Iave of the reactor current ILr takes a value close to the first command current ILa1*.

In a second time period P2 in which the AC voltage Vac is negative, the first and fourth gate signals GS1 and GS4 are in the low state, and the second and third gate signals GS2 and GS3 are in the high state. Thus, in the full-bridge circuit 12, the first and fourth switches SW1 and SW4 are switched off, and the second and third switches SW2 and SW3 are switched on. The controller 30 sets the first duty cycle D1 in order to control the reactor current ILr to be equal to the first command current ILa1* by the peak current mode control performed in the second time period P2.

Figure 4:
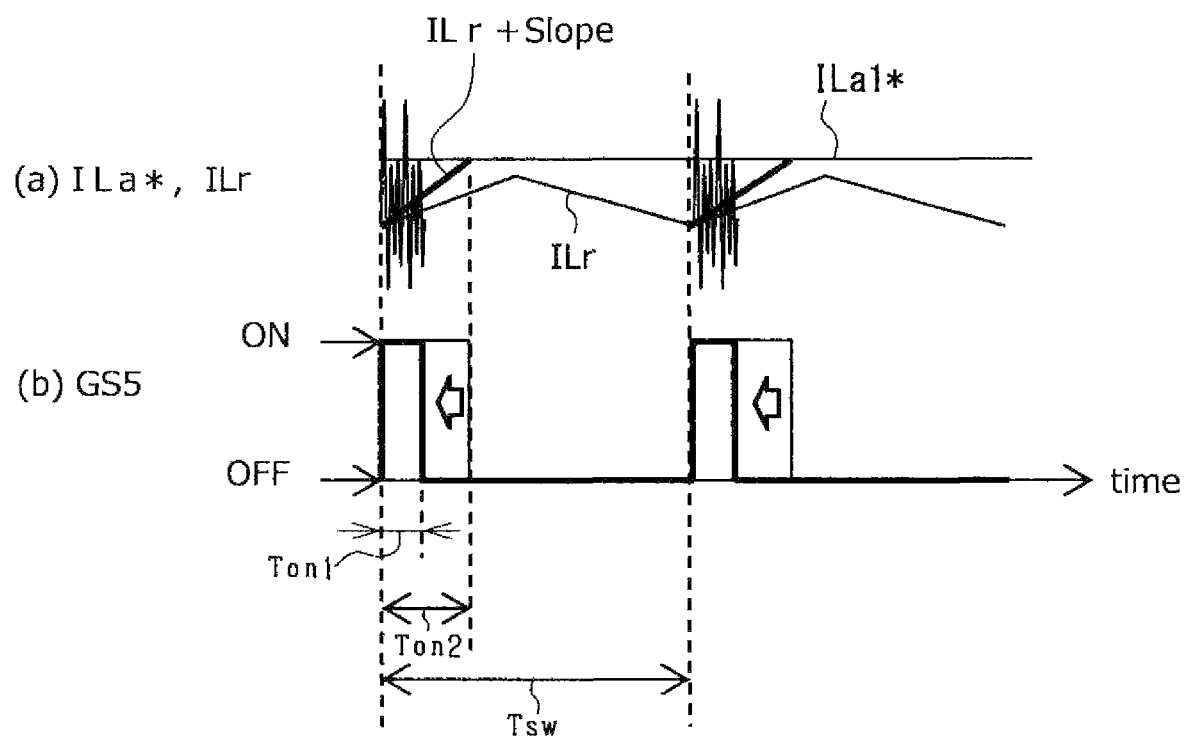
FIG. 4 is a diagram illustrating erroneous turn-off of a fifth switch.

To improve the power factor of the AC power to be supplied to the AC power source 200, the controller 30 sets a value obtained by multiplying the reference waveform sin θ of the AC voltage Vac by the amplitude command value Ia* as the uncorrected command current IL*. Thus, the first command current ILa1* obtained by adding the first correction value Ic1 to the uncorrected command current IL* has a waveform that repeats the positive half-wave of the sine wave every half cycle T. In FIG. 4, the first command current ILa1* increases from the zero-crossing points in time tb and td tc of the AC voltage Vac to the peak points in time tb and td of the AC voltage Vac. The first command current ILa1* decreases from the peak points in time tb and td of the AC voltage Vac to the zero-crossing points in time tc and te.

Like the first command current ILa1*, the average value Iave of the reactor current ILr changes in a positive half-wave manner so as to take a value close to zero at the zero-crossing points in time ta, tc, and te. Thus, during the peak current mode control, the reactor current ILr after compensation may exceed the first command current ILa1* due to noise such as switching noise superimposed on the reactor current ILr detected in the vicinity of the zero-crossing points in time ta, tc, and te of the AC voltage Vac. As a result, erroneous turn-off may undesirably occur in which the fifth switch SW5 is switched off at a point in time different from the intended point in time.

The erroneous turn-off will be described using FIG. 4. In FIG. 4, a switch-on time period Ton1 of the fifth switch SW5 is terminated before the termination point in time of an originally intended switch-on time period Ton2 due to the erroneous turn-off of the fifth switch SW5. Thus, the first duty cycle D1 of the fifth switch SW5 is less than the originally intended duty cycle. The decrease in the duty cycle caused by the erroneous turn-off of the fifth switch SW5 becomes a factor in causing a drop in the output current Iac in the vicinity of the zero-crossing points in time of the AC voltage Vac.

Average current mode control controls the average value of the reactor current ILr to be equal to the command current and is therefore believed to be less likely to be affected by the noise superimposed on the reactor current ILr compared with the peak current mode control. For this reason, the fifth switch SW5 may be operated using the average current mode control. The average current mode control, however, has a lower responsivity to the command current than the peak current mode control. If the fifth switch SW5 is operated by the average current mode control in all the time periods in the power conversion device 100, the responsivity to the command current may be undesirably decreased.

Given the circumstances, in the present embodiment, the controller 30 includes, in addition to the first setting section 50, a second setting section 80, which sets a second duty cycle D2 of the fifth switch SW5 by the average current mode control to control the average value of the reactor current ILr to be equal to the command current, as shown in FIG. 2. When the absolute value of the AC voltage Vac is equal to or more than a predetermined voltage threshold value TH1, the controller 30 operates the fifth switch SW5 at the first duty cycle D1 set by the first setting section 50. In contrast, when the absolute value of the AC voltage Vac is less than the voltage threshold value TH1, the controller 30 operates the fifth switch SW5 at the second duty cycle D2 set by the second setting section 80.

The voltage threshold value TH1 may be any value less than the amplitude of the AC voltage Vac and may be determined to, for example, a value 10% to 20% of the peak value of the AC voltage Vac. More preferably, the voltage threshold value TH1 may be determined to a value 10% of the peak value of the AC voltage Vac.

The controller 30 includes a command value changing section 75 and an adder 76 in addition to the second setting section 80 described above.

Figure 5:
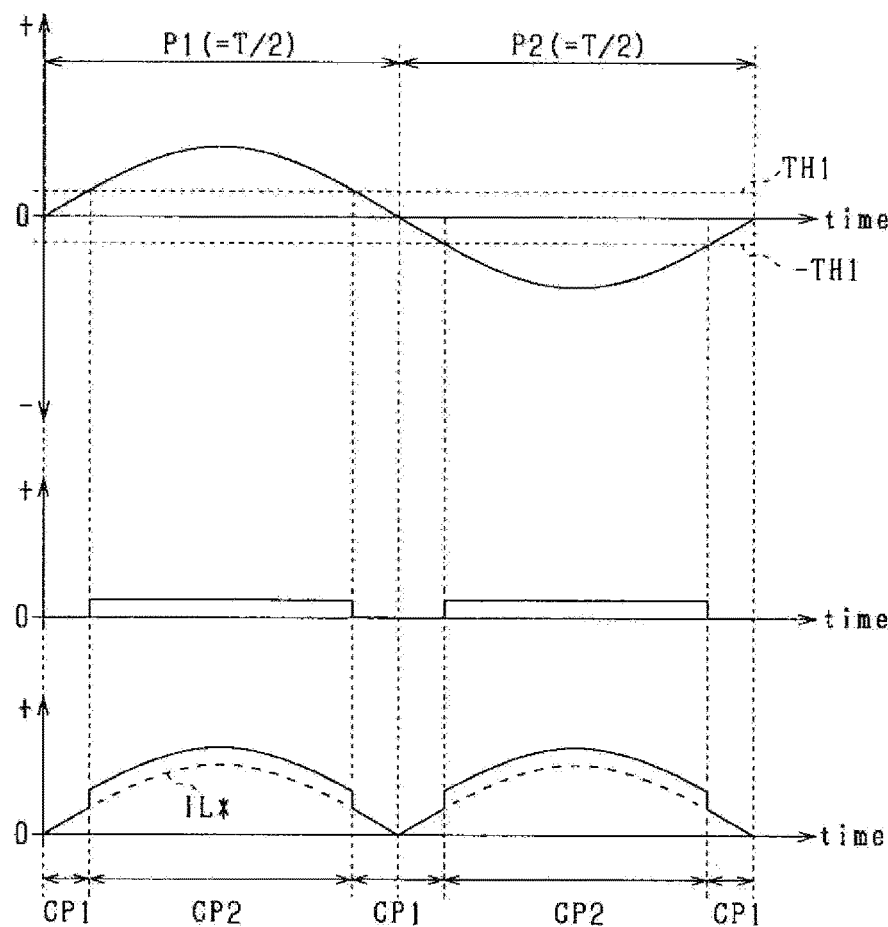
FIG. 5 is a diagram illustrating a second correction value.

The command value changing section 75 sets a second correction value Ic2 to be added to the uncorrected command current IL* on the basis of the AC voltage Vac. FIG. 5 shows changes in, for example, the second correction value Ic2. FIG. 5(a) shows changes in Vac, and FIG. 5(b) shows changes in Ic2. During the time period in which the absolute value of the AC voltage Vac is more than the voltage threshold value TH1, the command value changing section 75 sets the second correction value Ic2 to a constant value more than zero. Hereinafter, the time period during which the absolute value of the AC voltage Vac is equal to or less than the voltage threshold value TH1 will be referred to as a neighborhood time period CP1, and the time period during which the absolute value of the AC voltage Vac is more than the voltage threshold value TH1 will be referred to as a far time period CP2.

In the present embodiment, the command value changing section 75 sets the second correction value Ic2 to a value obtained by subtracting the maximum value of the uncorrected command current IL* from the rated current of the reactor 13 in the far time period CP2 of the AC voltage Vac. Furthermore, the command value changing section 75 sets the second correction value Ic2 to zero in the neighborhood time period CP1 of the AC voltage Vac.

The adder 76 adds the second correction value Ic2 to the uncorrected command current IL* and outputs the value after the addition as a second command current ILa2*. As shown in FIG. 5(c), since the second correction value Ic2 is zero in the neighborhood time period CP1 of the AC voltage Vac, the second command current ILa2* will be the same value as the uncorrected command current IL* shown by a broken line. In contrast, since the second correction value Ic2 is added to the second command current ILa2* in the far time period CP2 of the AC voltage Vac, the second command current ILa2* will be a value more than the uncorrected command current IL*. In the present embodiment, the command value changing section 75 corresponds to an average changing section.

The second setting section 80 includes a filter 81, a difference calculator 82, a PI control section 83, and a limiter 84. The reactor current ILr detected by the current sensor 32 is output to the filter 81. The filter 81 functions as a low-pass filter that filters out signals in a high-frequency band. With this function, the filter 81 acquires the average value of the reactor current ILr in one switching cycle Tsw and outputs the average value to the difference calculator 82. The difference calculator 82 calculates the difference between the second command current ILa2* and the average value of the reactor current ILr and outputs the calculated difference to the PI control section 83. The PI control section 83 calculates the second duty cycle D2 as the operation amount for feedback-controlling the difference output from the difference calculator 82 to be equal to zero. In the present embodiment, a proportional-integral (PI) control is used as the feedback control. The second duty cycle D2 calculated by the PI control section 83 is output to the duty control section 70 with the upper limit value limited by the limiter 84.

The duty control section 70 sets the second duty cycle D2, which is set by the second setting section 80, as the upper limit value DM used for limiting the first output signal OUT1 output by the first setting section 50. Thus, when the first duty cycle D1 of the first output signal OUT1 is equal to or less than the second duty cycle D2, which is set by the second setting section 80, the first output signal OUT1 will be the fifth gate signal GS5 without being changed. In contrast, when the first duty cycle D1 is more than the second duty cycle D2, the first output signal OUT1 the duty cycle of which is limited to the second duty cycle D2 will be the fifth gate signal GS5. In the present embodiment, the duty control section 70 corresponds to an operation section.

Figure 6:
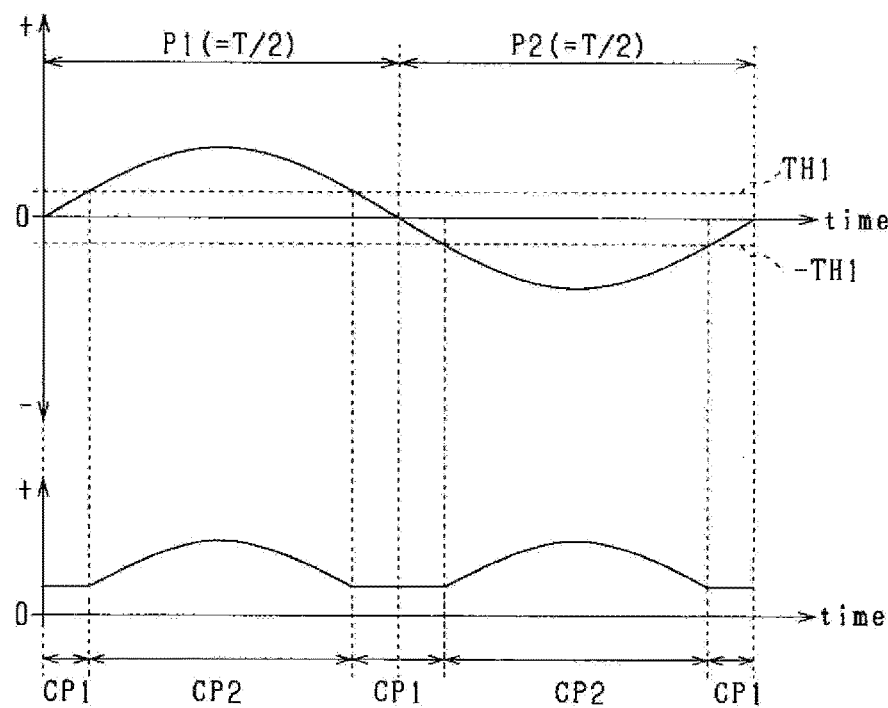
FIG. 6 is a diagram illustrating a first correction value.

Next, the first correction value Ic1 output by the current corrector 40 will be described using FIG. 6. In converting DC voltage to AC voltage, a divergence width Δi, which indicates the difference between the uncorrected command current IL* and the average Iave of the reactor current ILr that is distorted, takes the least value in the vicinity of the zero-crossing points in time. The divergence width Δi becomes a factor in distorting the output current Iac. The divergence width Δi may be computed using the following expression (1) in which the average value Iave of the reactor current ILr is subtracted from the uncorrected command current IL*.

[Expression 1]

$$\Delta i = ms \cdot \frac{\sqrt{2}\ Vrms \cdot |\sin\theta|}{Vdc} \cdot Tsw + \frac{\sqrt{2}\ Vrms \cdot |\sin\theta|(Vdc - \sqrt{2}\ Vrms \cdot |\sin\theta|)}{2LVdc} \cdot Tsw \quad (1)$$

The method for deriving the above Expression (1) will be discussed below.

In converting the input voltage Vdc to the AC voltage Vac using the above Expression (1), the divergence width Δi takes the minimum value in the zero-crossing points in time at which the AC voltage Vac becomes zero and takes the maximum value at the peak points in time at which the AC voltage Vac becomes the maximum. Thus, the first correction value Ic1 only needs to be calculated in accordance with the divergence width Δi calculated using the above Expression (1). In the present embodiment, the current corrector 40 sets the first correction value Ic1 so that the first correction value Ic1 takes the minimum value at the zero-crossing points in time of the AC voltage Vac and takes the maximum value at the peak points in time of the AC voltage Vac.

The current corrector 40 sets the first correction value Ic1 in accordance with the divergence width Δi represented by the above Expression (1). In the present embodiment, as shown in FIGS. 6(a) and 6(b), in the neighborhood time period CP1 of the AC voltage Vac, the current corrector 40 sets the first correction value Ic1 to a constant value that is less than the second correction value Ic2, which is set in the far time period CP2 of the AC voltage Vac, and that is more than zero. More specifically, in the neighborhood time period CP1, the current corrector 40 sets the first correction value Ic1 to the minimum value of the first correction value Ic1 that is set in the far time period CP2. In the present embodiment, the current corrector 40 corresponds to a peak changing section.

The current corrector 40 includes, for example, a correction value map that stores the first correction value Ic1 corresponding to the combination of the AC voltage Vac, the input voltage Vdc, and an effective value Vrms calculated on the basis of the AC voltage Vac. In the correction value map, the more the effective value Vrms of the AC power source 200, the more becomes the maximum value of the first correction value Ic1.

Figure 7:
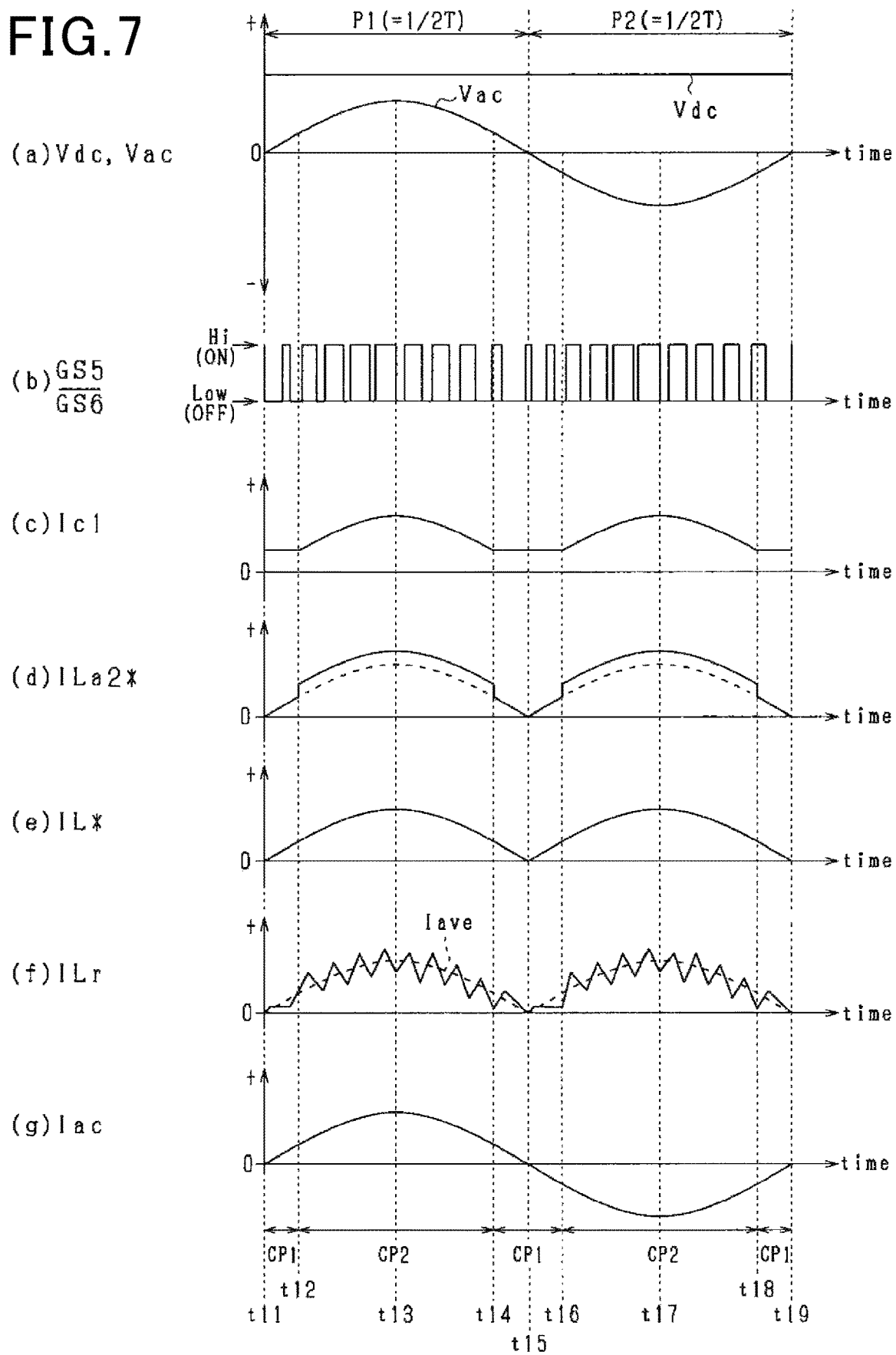
FIG. 7 is a timing diagram illustrating operation of the power conversion device.

Next, operation of the power conversion device 100 will be described using FIG. 7. FIG. 7(a) shows changes in the AC voltage Vac and the input voltage Vdc, and FIG. 7(b) shows changes in the fifth gate signal GS5 and the inverted value of the sixth gate signal GS6. FIG. 7(c) shows changes in the first correction value Ic1, and FIG. 7(d) shows changes in the second command current ILa2*. FIG. 7(e) shows changes in the uncorrected command current IL*, and FIG. 7(f) shows changes in the reactor current ILr. FIG. 7(g) shows changes in the output current Iac.

In a neighborhood time period CP1 (t11 to t12) of the first time period P1 in which the AC voltage Vac is positive, the first correction value Ic1 takes a value more than the second correction value Ic2. Thus, the first command current ILa1* obtained by adding the uncorrected command current IL* to the first correction value Ic1 takes a value more than the second command current ILa2* obtained by adding the uncorrected command current IL* to the second correction value Ic2. Consequently, in the neighborhood time period CP1 of the AC voltage Vac, the first duty cycle D1 set by the first setting section 50 becomes more than the second duty cycle D2 (upper limit value DM) set by the second setting section 80. As a result, the duty control section 70 outputs the first output signal OUT1 the duty cycle of which is limited to the second duty cycle D2. The first output signal OUT1 that has been output is sent to the fifth switch SW5, and a signal obtained by inverting the logic of the first output signal OUT1 that has been output is sent to the sixth switch SW6. Thus, in the neighborhood time period CP1, the fifth switch SW5 is operated at the second duty cycle D2 set by the average current mode control, and thus the distortion of the output current Iac is inhibited or reduced.

In the neighborhood time period CP1 of the AC voltage Vac, if an overcurrent flows to the reactor 13, causing the reactor current ILr to increase, the average of the reactor current ILr also increases. Since the responsivity to the command current is lower in the average current mode control than in the peak current mode control, the second duty cycle D2 increases as the average value of the reactor current ILr increases. Thus, the upper limit value DM of the duty control section 70 becomes more than the first duty cycle D1 set by the first setting section 50, causing the duty control section 70 to output the first output signal OUT1 that is unchanged to the fifth switch SW5. Consequently, the fifth switch SW5 is switched on and off by the peak current mode control, which is highly responsive. Thus, even if an overcurrent flows through the reactor 13, the overcurrent is promptly interrupted.

Subsequently, the second setting section 80 performs the average current mode control to control the average value of the reactor current ILr to be equal to the second command current ILa2*, so that the second duty cycle D2 becomes less than the first duty cycle D1. Thus, the duty control section 70 outputs the first output signal OUT1 the duty cycle of which is limited to the second duty cycle D2 to the fifth switch SW5.

In the far time period CP2 of the AC voltage Vac (t12 to t14) in the first time period P1, the second correction value Ic2 takes a value more than the first correction value Ic1, so that the second command current ILa2* becomes more than the first command current ILa1*. Thus, the second duty cycle D2 (upper limit value DM) set by the second setting section 80 becomes more than the first duty cycle D1 set by the first setting section 50. As a result, the duty control section 70 outputs the first output signal OUT1 that is unchanged to the fifth switch SW5 and outputs a signal obtained by inverting the logic of the first output signal OUT1 to the sixth switch SW6. In this manner, in the far time period CP2, the fifth switch SW5 is switched on and off at the first duty cycle D1 set by the peak current mode control, and thus the decrease in the responsivity to the first command current ILa1* is inhibited.

In the neighborhood time period CP1 (t15 to t16 and t18 to t19) of the second time period P2 (t15 to t19) of the AC voltage Vac also, the duty control section 70 outputs the first output signal OUT1 the duty cycle of which is limited to the second duty cycle D2. In the far time period CP2 (t16 to t18) of the AC voltage Vac, the duty control section 70 outputs the first output signal OUT1 that is unchanged. This inhibits the drop in the output current Iac and the decrease in the responsivity to the first command current ILa1* at the same time.

In the far time period CP2 of the AC voltage Vac, when an overcurrent flows through the reactor 13 due to an abnormality in the operation of the first setting section 50, the first duty cycle D1 is changed around a high value. In this case, with the second setting section 80 operating appropriately, the second duty cycle D2 set by the average current mode control takes a value which is less than the first duty cycle D1. Thus, the duty control section 70 outputs the first output signal OUT1 the duty cycle of which is limited to the second duty cycle D2 to the fifth switch SW5. Since the fifth switch SW5 is operated at the second duty cycle D2, an excessive current is inhibited from flowing through the reactor 13.

Next, a method for creating the correction value map will be described using FIG. 8.

In the present embodiment, the divergence width $\Delta i$ is a value obtained by subtracting the average value Iave of the reactor current ILr from the uncorrected command current IL*. Note that, in FIG. 8, D indicates the duty cycle in the switch-on time period of the fifth switch SW5.

Figure 8:
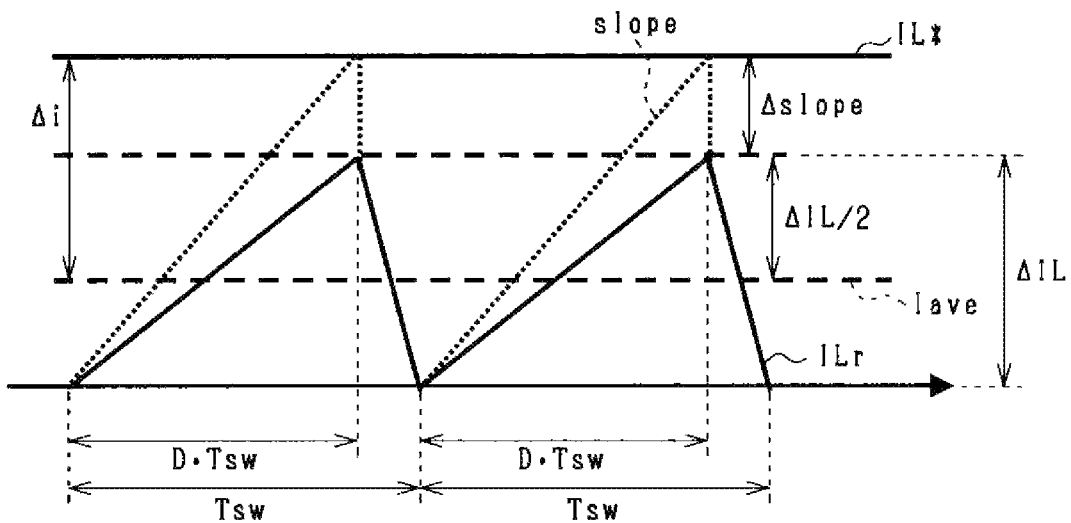
FIG. 8 is a diagram illustrating a divergence width.

Based on FIG. 8, the divergence width $\Delta i$ may be regarded as a value obtained by adding a value ($\Delta IL/2$) that is half the maximum increment $\Delta IL$ of the reactor current ILr to the maximum increment $\Delta$slope of the slope compensating signal Slope in the switch-on time period (=D×Tsw). Thus, the divergence width $\Delta i$ is calculated using the following Expression (2).

[Expression 2]

$$\Delta i = IL^* - Iave = \Delta slope + \Delta IL/2 \qquad (2)$$

Furthermore, the maximum increment $\Delta IL$ of the reactor current ILr can be calculated by the following Expression (3) using the voltage caused across two terminals of the reactor 13 and the inductance L of the reactor 13.

[Expression 3]

$$\Delta IL = \frac{Vdc - \sqrt{2}\, Vrms \cdot |\sin\theta|}{L} \cdot D \cdot Tsw \qquad (3)$$

The maximum increment $\Delta$slope of the slope compensating signal Slope can be calculated by the following Expression (4).

[Expression 4]

$$\Delta slope = ms \times D \times Tsw \qquad (4)$$

For example, the average value of an inclination ms may be used as the inclination ms of the slope compensating signal Slope for calculating the divergence width $\Delta i$.

The duty cycle D of the switch-on time period Ton of the fifth switch SW5 can be calculated by the following Expression (5) using the effective value Vrms of the AC voltage Vac.

[Expression 5]

$$D = \frac{\sqrt{2}\, Vrms \cdot |\sin\theta|}{Vdc} \qquad (5)$$

The divergence width $\Delta i$ is calculated as the above-mentioned Expression (1) by using the above-mentioned Expressions (2) to (5). In the present embodiment, the first correction value Ic1 is calculated using the divergence width $\Delta i$ represented by the above Expression (1). The correction value map is created by storing the calculated first correction value Ic1 for each effective value Vrms.

The present embodiment described above has the following advantages.

The duty control section 70 switches on and off the fifth switch SW5 at the first duty cycle D1 set by the first setting section 50 in the far time period CP2 of the AC voltage Vac and switches on and off the fifth switch SW5 at the second duty cycle D2 set by the second setting section 80 in the neighborhood time period CP1 of the AC voltage Vac. This inhibits the distortion of the output current Iac that is caused by the erroneous turn-off of the fifth switch SW5 while inhibiting the decrease in the responsivity of the reactor current ILr to the first command current ILa1*.

The duty control section 70 switches on and off the fifth switch SW5 in accordance with the less one of the first duty cycle D1 and the second duty cycle D2 in the neighborhood time period CP1 of the AC voltage Vac. In the neighborhood time period CP1 of the AC voltage Vac, the current corrector 40 sets the first duty cycle D1 to be more than the second duty cycle D2 by setting the first correction value Ic1, which is to be added to the uncorrected command current IL*, to be more than the second correction value Ic2. In the neighborhood time period CP1 of the AC voltage Vac, the fifth switch SW5 is likely to be switched on and off by the average current mode control. Furthermore, if the reactor current ILr becomes excessively large, the average value of the reactor current ILr is increased, thus increasing the second duty cycle D2, so that the upper limit value DM of the duty control section 70 becomes more than the first duty cycle D1. Thus, the first output signal OUT1 is output to the fifth switch SW5 unchanged, so that the fifth switch SW5 is switched on and off at the first duty cycle D1, and thus an excessive current is inhibited from flowing through the reactor current ILr.

In the far time period CP2 of the AC voltage Vac, the command value changing section 75 sets the second duty cycle D2 to be more than the first duty cycle D1 by setting the second correction value Ic2 to be more than the first correction value Ic1. Thus, in the far time period CP2 of the AC voltage Vac, the fifth switch SW5 is likely to be switched on and off by the peak current mode control. If the first duty cycle D1 set by the first setting section 50 is increased due to the peak current mode control not operating appropriately, the first duty cycle D1 is likely to become more than the second duty cycle D2. In this case, the fifth switch SW5 is switched on and off at the second duty cycle D2, so that the increase in the reactor current ILr is inhibited.

Modification of First Embodiment

A current sensor that detects the reactor current used by the first setting section 50 and a current sensor that detects the reactor current used by the second setting section 80 may be separately provided.

Figure 9:
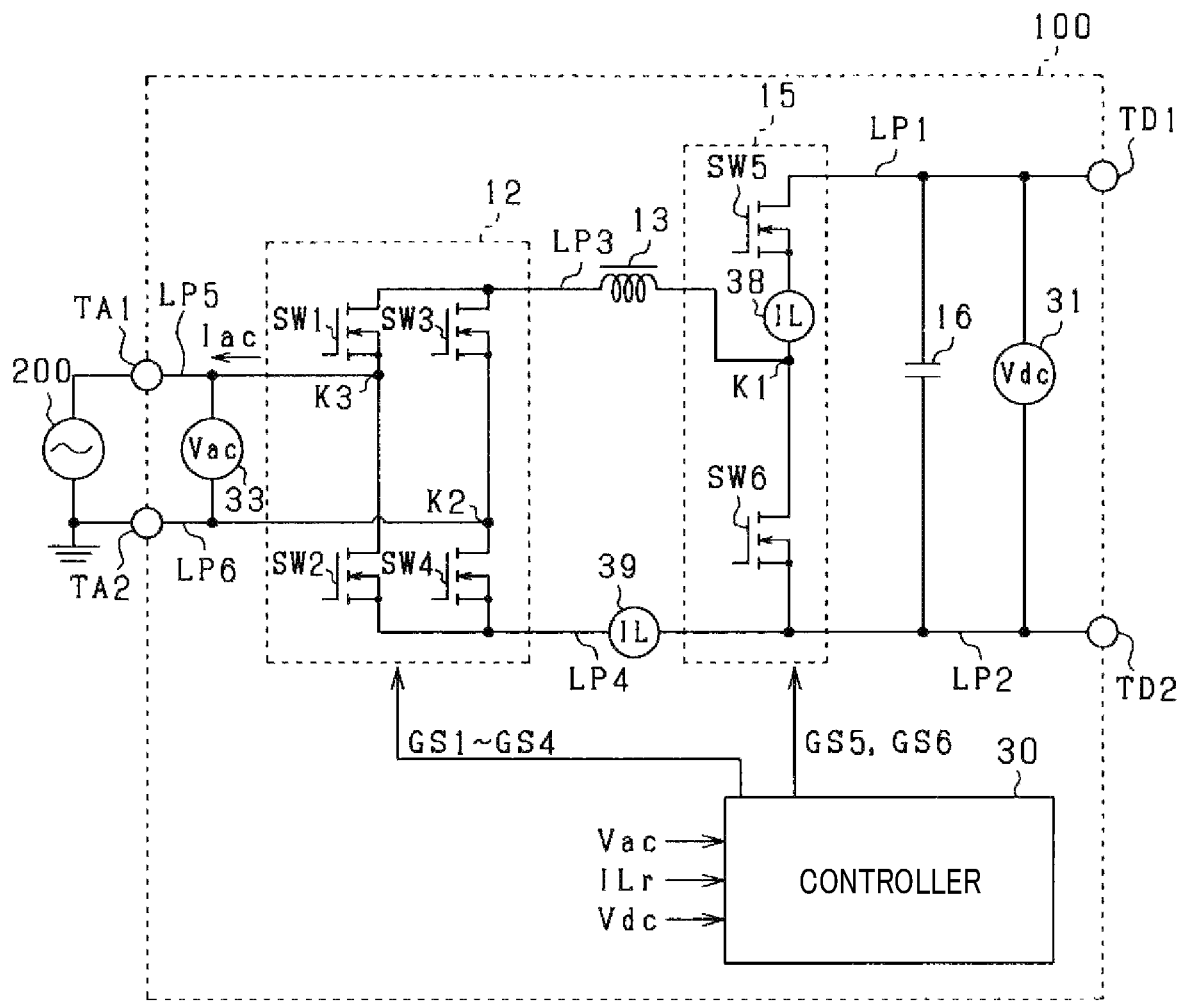
FIG. 9 is a diagram of a power conversion device according to a modification.

FIG. 9 is a diagram of the power conversion device 100 according to the present embodiment. In the present embodiment, a first current sensor 38 is located between the source of the fifth switch SW5 and the first contact point K1. The fourth line LP4 is provided with a second current sensor 39. The current detected by the first current sensor 38 is used for the peak current mode control performed by the first setting section 50. The reactor current ILr detected by the second current sensor 39 is used for the average current mode control performed by the second setting section 80.

The present embodiment described above also achieves the same advantages as the first embodiment.

Second Embodiment

In the second embodiment, configurations different from those in the first embodiment will mainly be described. It is to be noted that components with the reference numerals that are the same as those of the first embodiment designate identical components, and the description thereof will not be repeated.

Figure 10:
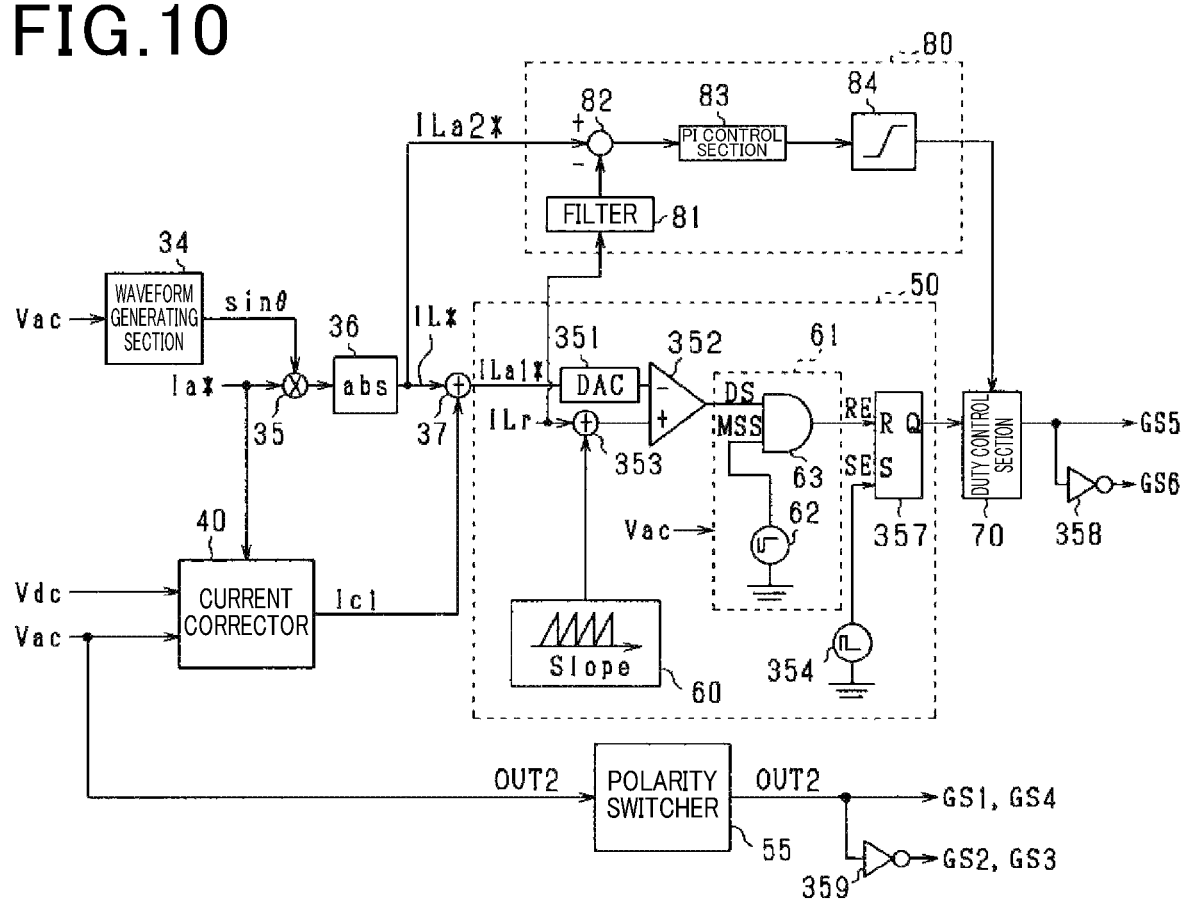
FIG. 10 is a functional block diagram of a controller according to a second embodiment.

In the present embodiment, as shown in FIG. 10, the mask time setting section 61 receives the AC voltage Vac detected by the second voltage sensor 33. The pulse generating section 62 changes the upper limit value DM of the duty control section 70 by increasing the mask time TM during the time period in which the absolute value of the AC voltage Vac is less than the voltage threshold value TH1. In the present embodiment, the controller 30 does not include the command value changing section 75 and the adder 76. The mask time setting section 61 corresponds to the average changing section.

Figure 11:
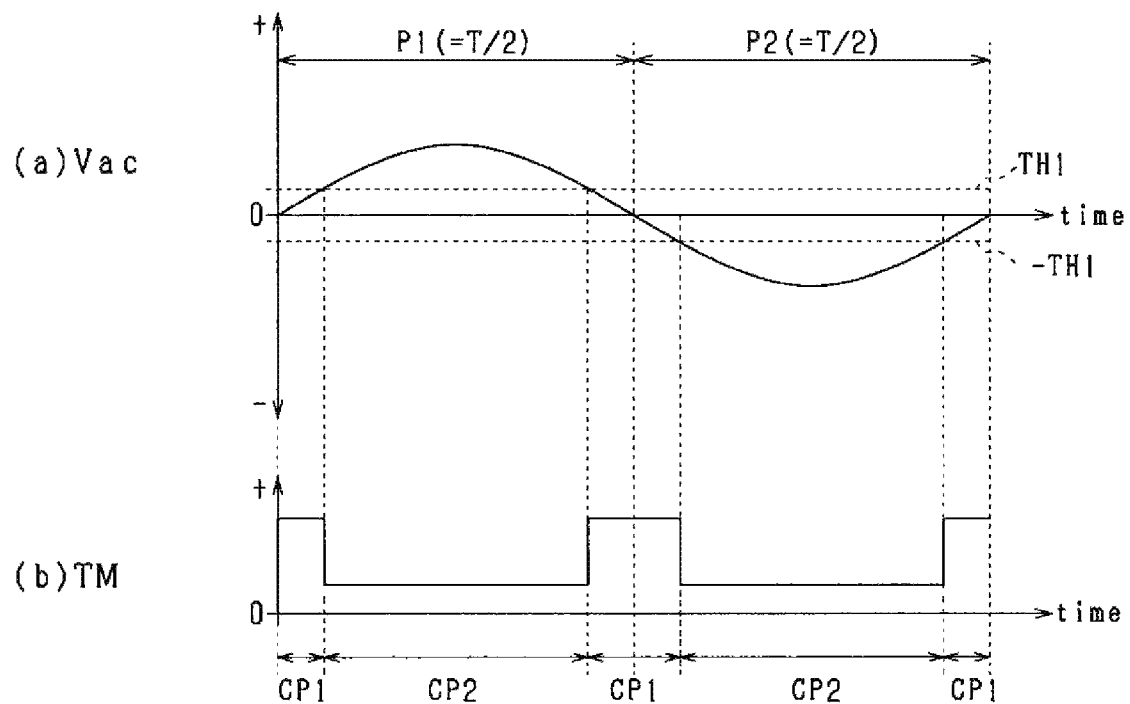
FIG. 11 is a timing diagram illustrating changes in a mask time.

The mask time TM set in accordance with the AC voltage Vac will be described using FIG. 11. The pulse generating section 62 sets the mask time TM in one switching cycle Tsw to its maximum value during the neighborhood time period CP1 of the AC voltage Vac. The maximum value of the mask time TM only needs to be, for example, a length equal to or more than 60% of one switching cycle Tsw of the fifth switch SW5. In the present embodiment, the maximum value of the mask time TM is set to a length 100% of one switching cycle Tsw.

The pulse generating section 62 sets the mask time TM to the minimum value during the far time period CP2 of the AC voltage Vac. The minimum value of the mask time TM only needs to be set to a value more than 0 and less than the switch-on time period Ton intended by the first command current ILa1* during the operation time period of the fifth switch SW5 including the zero-crossing points in time, for example.

Figure 12:
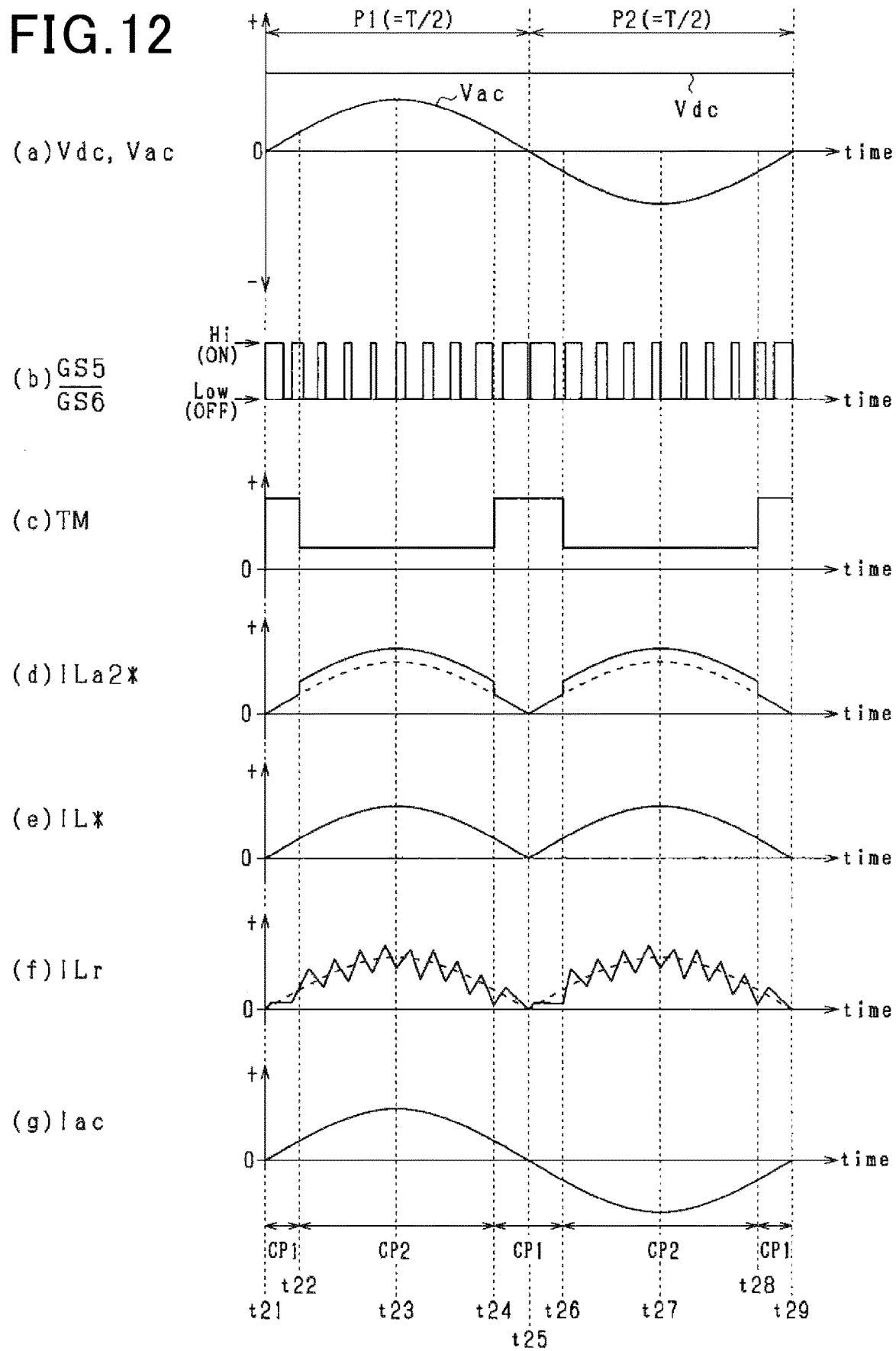
FIG. 12 is a timing diagram illustrating operation of the power conversion device.

Next, operation of the power conversion device 100 will be described using FIG. 12. FIG. 12(a) shows changes in the AC voltage Vac and the input voltage Vdc, and FIG. 12(b) shows changes in the fifth gate signal GS5 and the value obtained by inverting the sixth gate signal GS6. FIG. 12(c) shows changes in the mask time TM, and FIG. 12(d) shows changes in the second command current ILa2*. FIG. 12(e) shows changes in the uncorrected command current IL*, FIG. 12(f) shows changes in the reactor current ILr, and FIG. 12(g) shows changes in the output current Iac.

The mask time TM takes the maximum value in the neighborhood time period CP1 of the AC voltage Vac in the first time period P1 (t21 to t25), so that the first duty cycle D1 set by the first setting section 50 becomes more than the second duty cycle D2 (upper limit value DM) set by the second setting section 80. As a result, the duty control section 70 outputs the first output signal OUT1 the duty cycle of which is limited to the second duty cycle D2 to the fifth switch SW5 and outputs a value obtained by inverting the logic of the first output signal OUT1 with the limited duty cycle, to the sixth switch SW6. Thus, in the neighborhood time period CP1 of the AC voltage Vac, the fifth switch SW5 is switched on and off at the second duty cycle D2 set by the average current mode control, and thus the distortion of the output current Iac is inhibited or reduced.

In the far time period CP2 subsequent to the neighborhood time period CP1 of the AC voltage Vac in the first time period P1, the second correction value Ic2 to be added to the uncorrected command current IL* takes a value more than zero, so that the second command current ILa2* takes a value more than the first command current ILa1*. Thus, since the upper limit value DM of the duty control section 70 becomes more than the first duty cycle set by the first setting section 50, the duty control section 70 outputs the first output signal OUT1 that is unchanged to the fifth switch SW5 and outputs a value obtained by inverting the logic of the first output signal OUT1 to the sixth switch SW6. Thus, in the far time period CP2 of the AC voltage Vac, the fifth switch SW5 is switched on and off at the first duty cycle D1 set by the peak current mode control, and thus the decrease in the responsivity to the first command current ILa1* is inhibited.

In the neighborhood time period CP1 of the AC voltage Vac in the second time period P2 (t25 to t29) in which the AC voltage Vac takes a negative value, the duty control section 70 outputs the first output signal OUT1 the duty cycle of which is limited to the second duty cycle D2, to the fifth switch SW5. In the far time period CP2 of the AC voltage Vac, the duty control section 70 outputs the first output signal OUT1 that is unchanged to the fifth switch SW5. This inhibits the distortion of the output current Iac and the decrease in the responsivity to the first command current ILa1* at the same time.

The present embodiment described above also achieves the same advantages as the first embodiment.

Modification of Second Embodiment

In the neighborhood time period CP1 of the AC voltage Vac, the current corrector 40 does not necessarily have to perform the correction of the uncorrected command current IL* using the first correction value Ic1. In this case, in the neighborhood time period CP1 of the AC voltage Vac, the mask time setting section 61 increases the mask time TM, so that the first duty cycle D1 is set to a value more than the second duty cycle D2.

Third Embodiment

In the third embodiment, configurations different from those in the second embodiment will mainly be described. It is to be noted that components with the reference numerals that are the same as those of the first embodiment designate identical components, and the description thereof will not be repeated.

Figure 13:
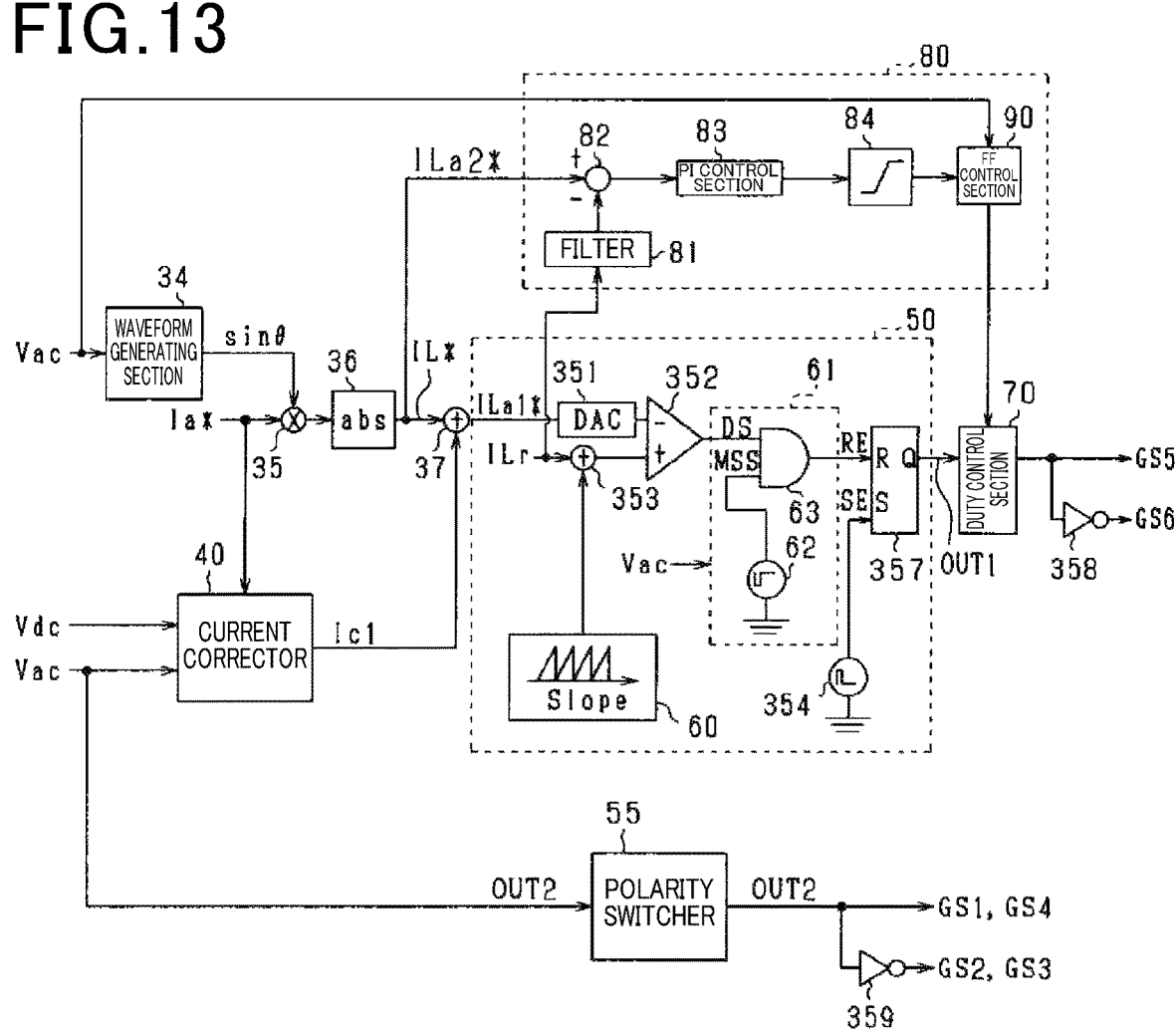
FIG. 13 is a functional block diagram of a controller according to a third embodiment.

In the present embodiment, as shown in FIG. 13, the second setting section 80 includes a feedforward control section (hereinafter, referred to as a FF control section 90). The FF control section 90 changes the upper limit value DM of the duty control section 70. In the present embodiment, the FF control section 90 corresponds to the average changing section.

Figure 14:
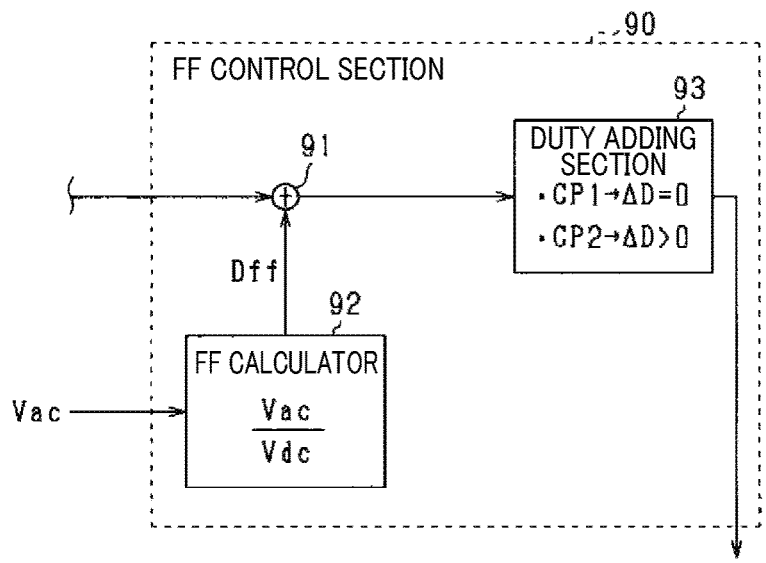
FIG. 14 is a functional block diagram of a feedforward control section.

Hereinafter, the FF control section 90 will be described using FIGS. 13 and 14. The FF control section 90 includes an adder 91, which adds a feedforward duty cycle Dff (=Vac/Vdc) to the second duty cycle D2 output from the limiter 84. The feedforward duty cycle Dff is a value for controlling the reactor current ILr to be equal to the second command current ILa2* and is calculated by a FF calculator 92. The second duty cycle D2 to which the feedforward duty cycle Dff has been added is output to a duty adding section 93. The duty adding section 93 calculates a positive adjustment amount ΔD in accordance with the AC voltage Vac and adds the calculated adjustment amount ΔD to the second duty cycle D2.

In the present embodiment, the duty adding section 93 sets the adjustment amount ΔD to zero in the neighborhood time period CP1 of the AC voltage Vac. In contrast, the duty adding section 93 sets the adjustment amount ΔD to a constant value more than zero in the far time period CP2 of the AC voltage Vac. Thus, in the neighborhood time period CP1 of the AC voltage Vac, the first duty cycle D1 set by the first setting section 50 takes a value more than the second duty cycle D2 set by the second setting section 80. In contrast, in the far time period CP2 of the AC voltage Vac, the second duty cycle D2 takes a value more than the first duty cycle D1.

The present embodiment described above also achieves the same advantages as the first embodiment.

Fourth Embodiment

In the fourth embodiment, configurations different from those in the first embodiment will mainly be described. It is to be noted that components with the reference numerals that are the same as those of the first embodiment designate identical components, and the description thereof will not be repeated.

The present embodiment differs from the power conversion device 100 shown in the first embodiment in the circuit topology. More specifically, the power conversion device 100 according to the present embodiment differs from that of the first embodiment in that it does not include the half-bridge circuit.

Figure 15:
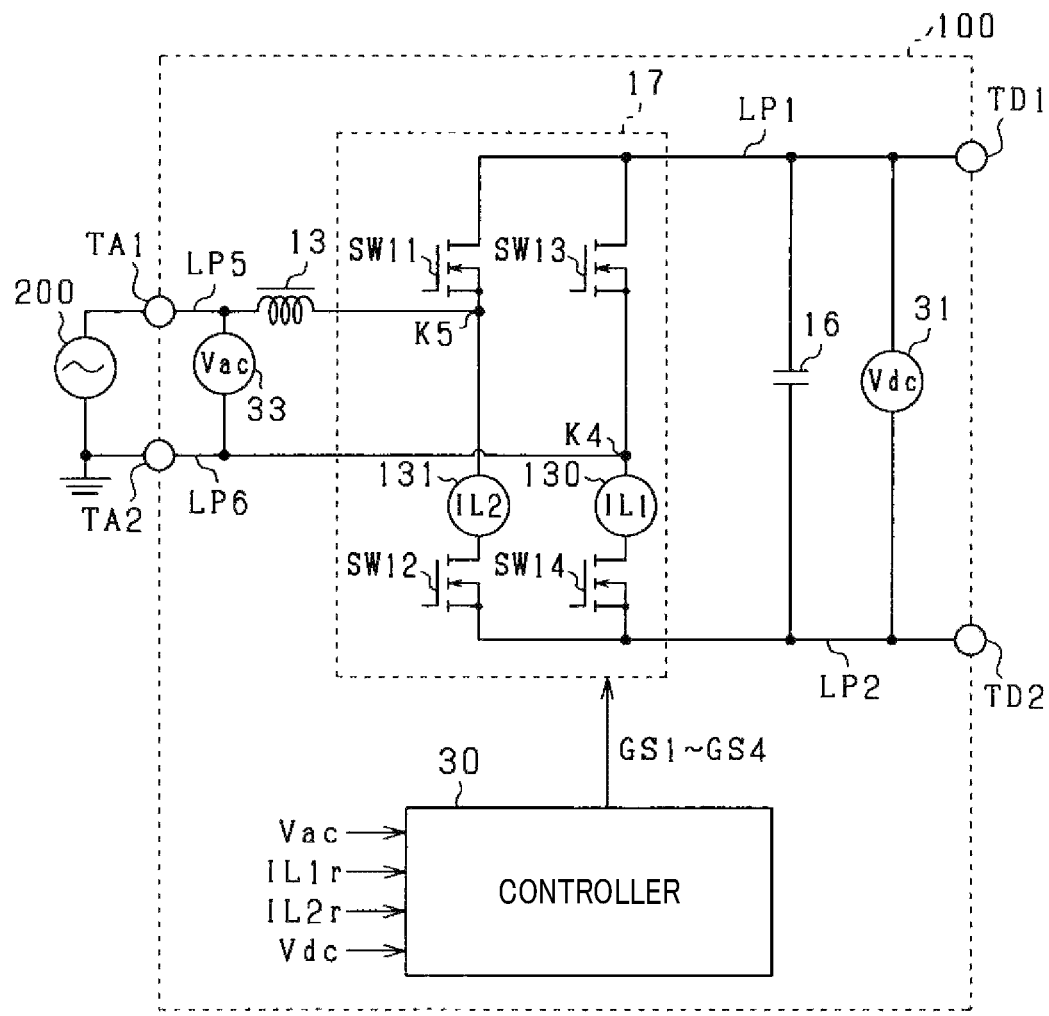
FIG. 15 is a diagram of a power conversion device according to a fourth embodiment.

FIG. 15 is a diagram of the power conversion device 100 according to the present embodiment. The first DC terminal TD1 and a full-bridge circuit 17 are connected to each other with the first line LP1. The second DC terminal TD2 and the full-bridge circuit 17 are connected to each other with the second line LP2.

The full-bridge circuit 17 includes first to fourth switches SW11 to SW14. Since the first to fourth switches SW11 to SW14 have the same circuit configuration as the first to fourth switches SW1 to SW4 of the full-bridge circuit 12 of the first embodiment, the description thereof will be omitted.

A fourth contact point K4 is located between the source of the third switch SW13 and the drain of the fourth switch SW14. A first current sensor 130 is located between the fourth contact point K4 and the drain of the fourth switch SW14. The first current sensor 130 detects current flowing through the third and fourth switches SW13 and SW14 as a first reactor current IL1r. A fifth contact point K5 is located between the source of the first switch SW11 and the drain of the second switch SW12. A second current sensor 131 is located between the fifth contact point K5 and the drain of the second switch SW12. The second current sensor 131 detects current flowing through the first and second switches SW11 and SW12 as a second reactor current IL2r.

Figure 16:
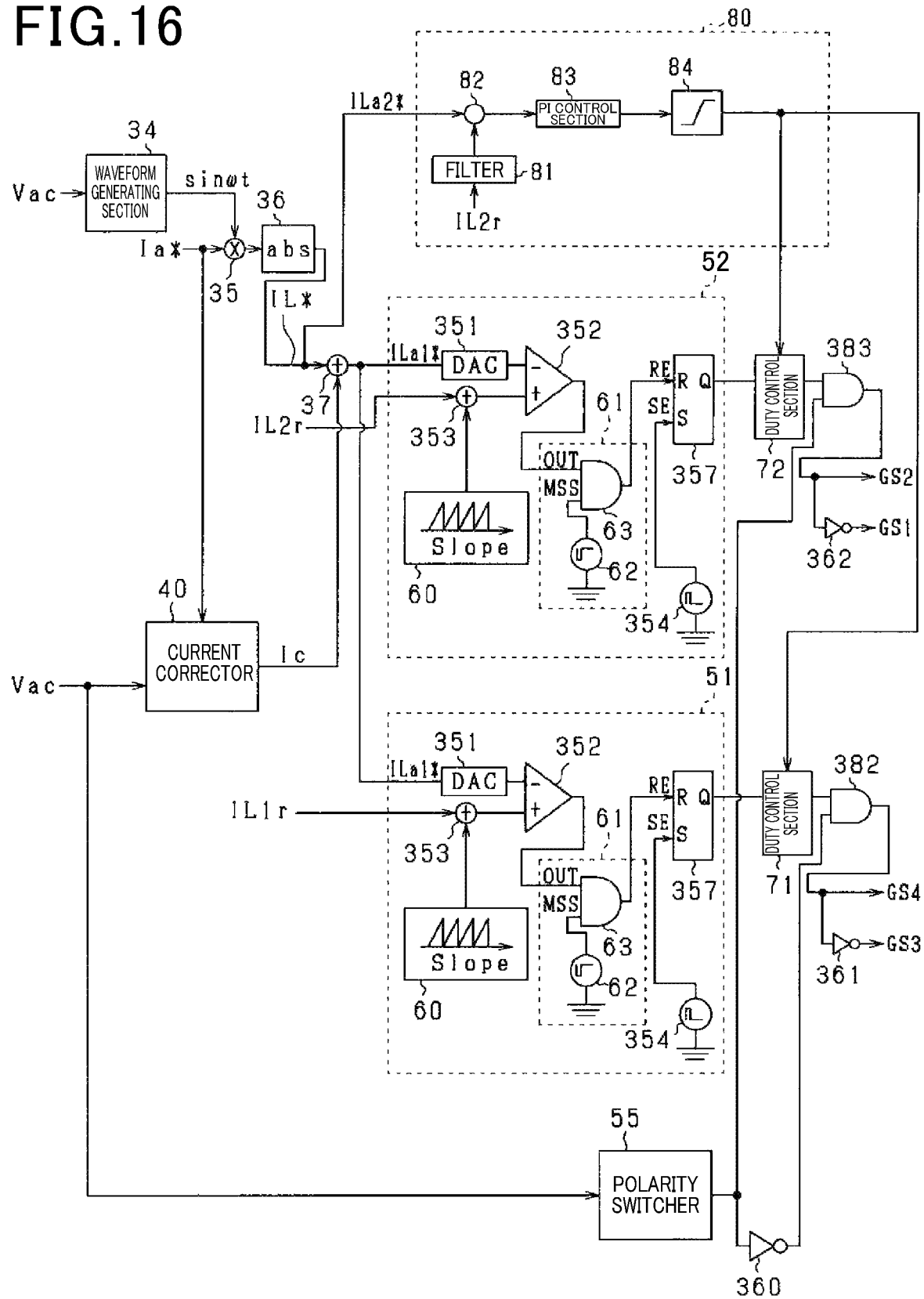
FIG. 16 is a functional block diagram of the controller.

FIG. 16 is a functional block diagram of the controller 30 according to the present embodiment. The controller 30 includes a positive side setting section 51 and a negative side setting section 52 as a first setting section. The positive side setting section 51 performs the peak current mode control to control the first reactor current IL1r detected by the first current sensor 130 to be equal to the first command current ILa1*. The negative side setting section 52 performs the peak current mode control to control the second reactor current IL2r detected by the second current sensor 131 to be equal to the first command current ILa1*. Since the configuration of the positive side setting section 51 and the negative side setting section 52 is the same as the configuration of the first setting section 50 of the first embodiment, the description thereof will be omitted.

The filter 81 of the second setting section 80 receives the second reactor current IL2r detected by the second current sensor 131. Note that, the filter 81 may receive the first reactor current IL1r detected by the first current sensor 130.

The output of the positive side setting section 51 is connected to one of input terminals of a first AND circuit 382 via a duty control section 71. The output of the negative side setting section 52 is connected to one of input terminals of a second AND circuit 383 via a duty control section 72. The duty control sections 71 and 72 receive the second duty cycle D2 from the second setting section 80. In the present embodiment also, the duty control sections 71 and 72 set the second duty cycle D2 as the upper limit value DM.

The output terminal of the polarity switcher 55 is connected to the other one of the input terminals of the second AND circuit 383 and the input terminal of an inverter 360. The output terminal of the inverter 360 is connected to the other one of the input terminals of the first AND circuit 382.

The first AND circuit 382 receives the output signal of the RS flip-flop 357 of the positive side setting section 51 and the output signal from the polarity switcher 55. The output terminal of the first AND circuit 382 is connected to the gate of the fourth switch SW14. The signal output from the first AND circuit 382 to the gate of the fourth switch SW14 will be the fourth gate signal GS4. The output terminal of the first AND circuit 382 is connected to the gate of the third switch SW13 via an inverter 361. The signal output from the first AND circuit 382 to the gate of the third switch SW13 via the inverter 361 will be the third gate signal GS3. The third gate signal GS3 is obtained by inverting the logic of the fourth gate signal GS4.

The second AND circuit 383 receives the output signal of the RS flip-flop 357 of the negative side setting section 52 and the output signal from the polarity switcher 55. The output side of the second AND circuit 383 is connected to the gate of the second switch SW12. The signal output from the second AND circuit 383 to the gate of the second switch SW12 will be the second gate signal GS2. The output terminal of the second AND circuit 383 is also connected to the gate of the first switch SW11 via an inverter 362. The signal output from the second AND circuit 383 to the gate of the first switch SW11 via the inverter 362 will be the first gate signal GS1. The first gate signal GS1 is obtained by inverting the logic of the second gate signal GS2.

Upon receipt of the output signal of the polarity switcher 55 in the high state and the output signal of the RS flip-flop 357 in the high state, the first AND circuit 382 outputs the fourth gate signal GS4 in the high state and outputs the third gate signal GS3 in the low state. Furthermore, upon receipt of the output signal of the polarity switcher 55 in the high state and the output signal of the RS flip-flop 357 in the high state, the second AND circuit 383 outputs the second gate signal GS2 in the high state and the first gate signal GS1 in the low state.

Figure 17:
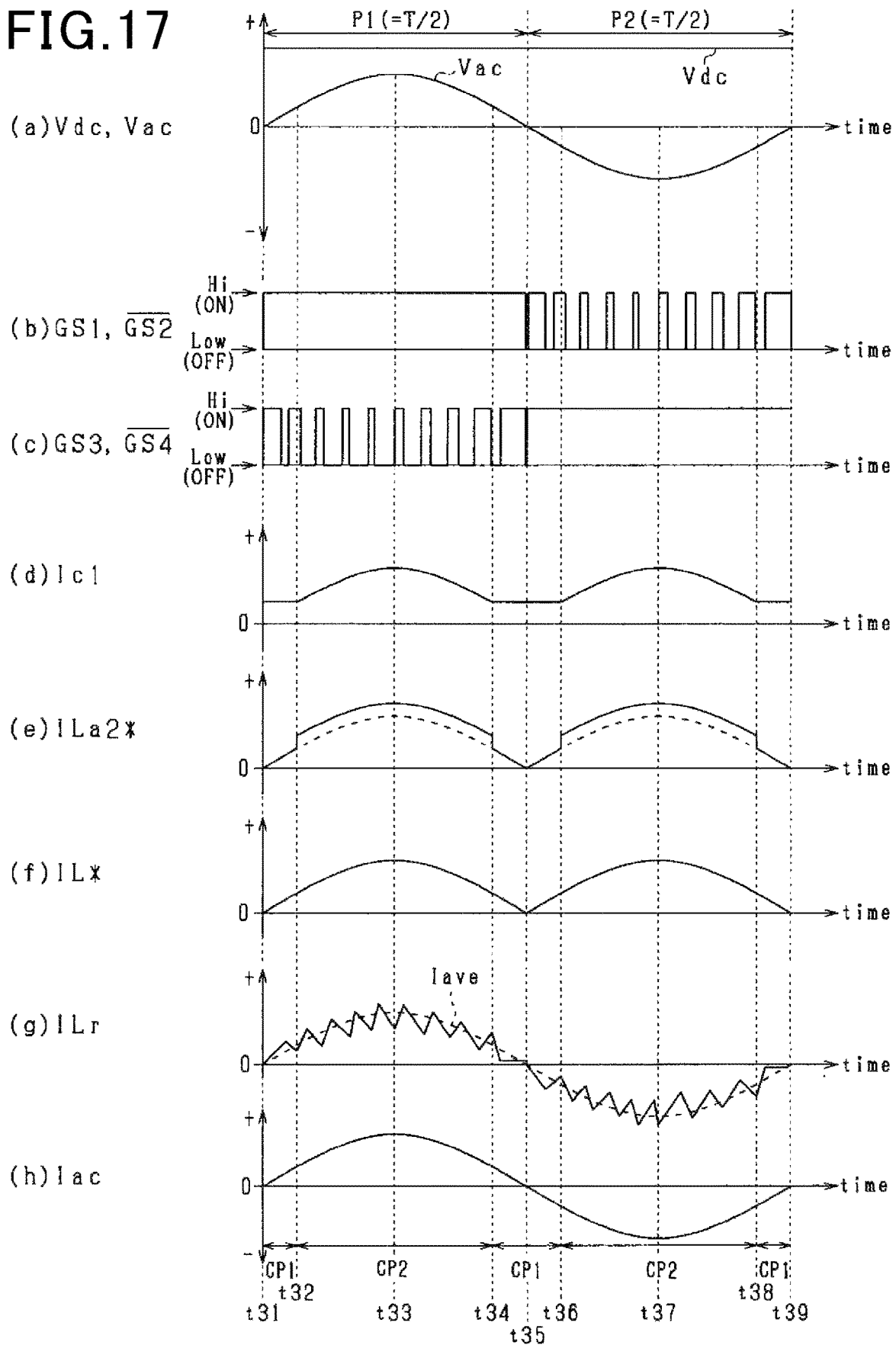
FIG. 17 is a timing diagram illustrating operation of the power conversion device.

FIG. 17 is a timing diagram of the power conversion device 100 according to the present embodiment. FIG. 17(a) shows changes in the input voltage Vdc and the AC voltage Vac. FIG. 17(b) shows changes in the first gate signal GS1 and changes in the value obtained by inverting the logic of the second gate signal GS2. FIG. 17(c) shows changes in the third gate signal GS3 and changes in the value obtained by inverting the logic of the fourth gate signal GS4. FIG. 17(d) shows changes in the first correction value Ic1, and FIG. 17(e) shows changes in the second command current ILa2*. FIG. 17(f) shows changes in the uncorrected command current IL*, FIG. 17(g) shows changes in the reactor current ILr, and FIG. 17(h) shows changes in the output current Iac.

In the first time period P1 in which the AC voltage Vac is positive, the first switch SW11 is switched on when the first gate signal GS1 is brought into the high state, and the second switch SW12 is switched off when the second gate signal GS2 is brought into the low state.

In the neighborhood time period CP1 (t31 to t32 and t34 to t35) of the AC voltage Vac, the value obtained by adding the first correction value Ic1 to the uncorrected command current IL* will be the first command current ILa1*, and the value obtained by adding the second correction value Ic2 to the uncorrected command current IL* will be the second command current ILa2*. In the neighborhood time period CP1 of the AC voltage Vac, since the first command current ILa1* becomes more than the second command current ILa2*, the first output signal OUT1 the duty cycle of which is limited to the second duty cycle D2 is output to the third switch SW3, and the value obtained by inverting the logic of the first output signal OUT1 with the limited duty cycle is output to the fourth switch SW4.

In the second time period P2, the third switch SW13 is switched on when the third gate signal GS3 is brought into the high state, and the fourth switch SW14 is switched off when the fourth gate signal GS4 is brought into the low state.

In the neighborhood time period CP1 (t35 to t36 and t38 to t39) of the AC voltage Vac, the first command current ILa1* becomes more than the second command current ILa2*. Thus, the duty control section 70 outputs the second output signal OUT2 the duty cycle of which is limited to the second duty cycle D2 to the second switch SW2, and outputs the value obtained by inverting the logic of the first output signal OUT1 with the limited duty cycle to the first switch SW1.

The present embodiment described above also achieves the same advantages as the first embodiment.

Fifth Embodiment

The present embodiment includes an operating section that switches between the output signal output from the first setting section 50 and the output signal output from the second setting section 80 in accordance with the absolute value of the AC voltage Vac. Hereinafter, the output signal output from the second setting section 80 will be referred to as a third output signal OUT3.

Figure 18:
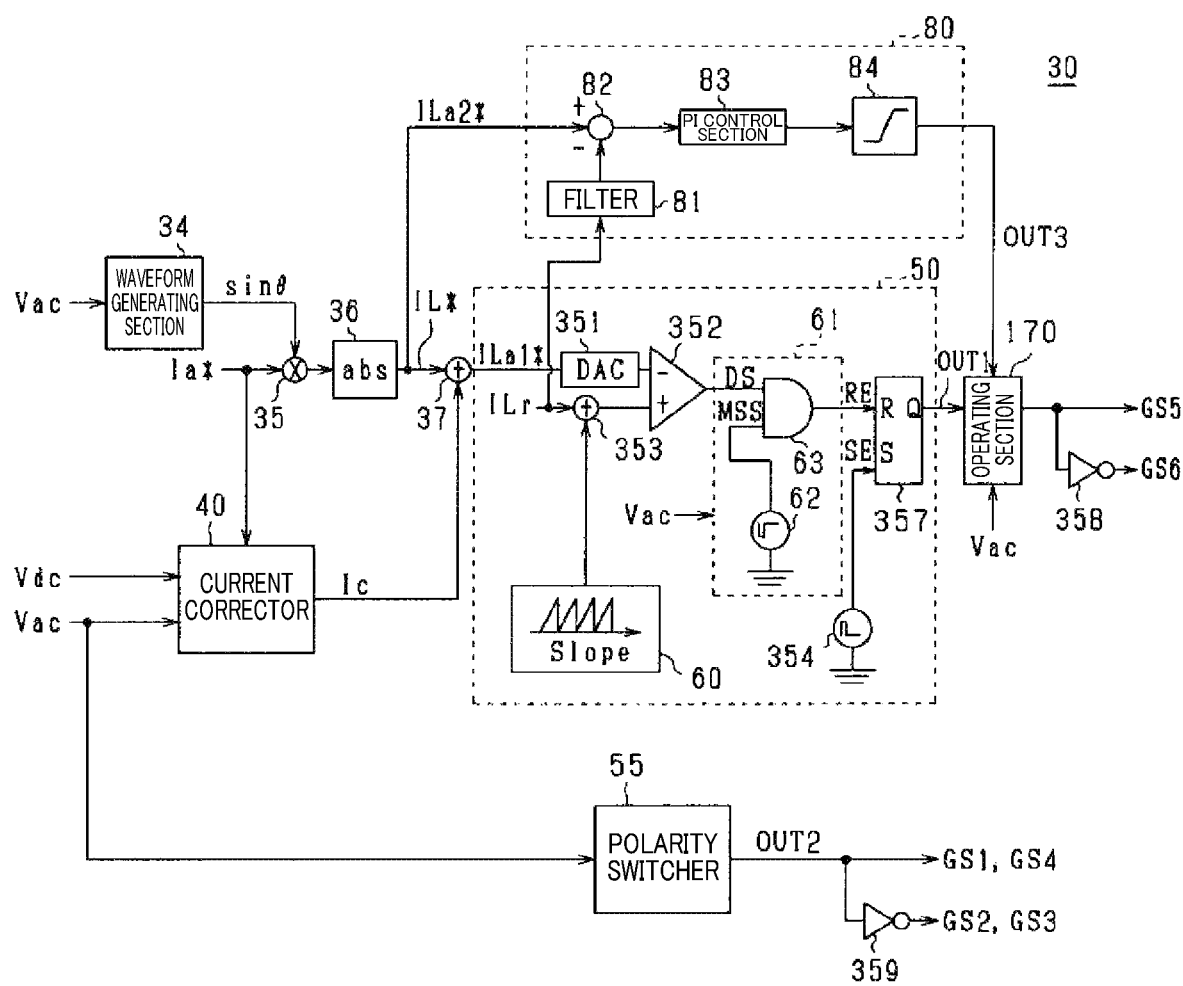
FIG. 18 is a diagram of a power conversion device according to a fifth embodiment.

As shown in FIG. 18, an operating section 170 receives the AC voltage Vac detected by the second voltage sensor 33. When the absolute value of the AC voltage Vac is equal to or less than the voltage threshold value TH1, the operating section 170 outputs the first output signal OUT1 calculated by the first setting section 50. In this case, the first output signal OUT1 is output to the fifth switch SW5 as the fifth gate signal GS5 unchanged, and the value obtained by inverting the logic of the first output signal OUT1 is output to the sixth switch SW6 as the sixth gate signal GS6. In contrast, when the absolute value of the AC voltage Vac is more than the voltage threshold value TH1, the operating section 170 outputs the third output signal OUT3 calculated by the second setting section 80. In this case, the third output signal OUT3 is output to the fifth switch SW5 as the fifth gate signal GS5 unchanged, and the value obtained by inverting the logic of the third output signal OUT3 is output to the sixth switch SW6 as the sixth gate signal GS6.

The present embodiment described above also achieves the same advantages as the first embodiment.

Other Embodiments

The switch configuring the full-bridge circuit 12 does not necessarily have to be a metal-oxide-semiconductor field-effect transistor (MOSFET) but may be, for example, an insulated gate bipolar transistor (IGBT).

Although the present disclosure has been described in accordance with the embodiments, it is understood that the present disclosure is not limited to the embodiments and the configurations. The present disclosure embraces various modified examples and modifications that come within the range of equivalency. Additionally, various combinations and forms, or other combinations and forms including only one or more additional elements, or less than all elements are included in the scope and ideas obtainable from the present disclosure.

The present disclosure relates to a controller (30) for a DC to AC conversion device that is applicable to a DC to AC conversion device (100), which includes a reactor (13) and a drive switch (SW5), converts DC voltage supplied through an input terminal (TD1, TD2) to AC voltage, and supplies the converted AC voltage to an AC source connected to an output terminal (TA1, TA2). The controller includes a current acquisition section, an AC voltage acquisition section, a first setting section (50, 51, 52), a second setting section (80), and an operating section (70). The current acquisition section acquires a reactor current. The reactor current is a value of current flowing through the reactor. The AC voltage acquisition section acquires an AC voltage value. The AC voltage value is a voltage value of the AC source. The first setting section sets a first duty cycle, which is a percentage of a switch-on time period of the drive switch in one switching cycle, by peak current mode control to control the acquired reactor current to be equal to a current command value generated in accordance with the acquired AC voltage value. The second setting section sets a second duty cycle, which is the percentage of the switch-on time period of the drive switch in one switching cycle, by average current mode control to control an average of the acquired reactor current to be equal to the current command value. The operating section operates the drive switch at the first duty cycle set by the first setting section when an absolute value of the acquired AC voltage value is equal to or more than a voltage threshold value which is less than an amplitude of the acquired AC voltage value and operates the drive switch at the second duty cycle set by the second setting section when the absolute value of the acquired AC voltage value is less than the voltage threshold value.

The DC to AC conversion device that uses the peak current mode control sets the current command value of the reactor current that flows through the reactor in accordance with the AC voltage to improve the power factor of the AC power to be supplied to the AC source. Thus, in the vicinity of the zero-crossing point in time of the AC voltage, the duty cycle that indicates the percentage of the switch-on time period in one switching cycle takes the minimum value to make the reactor current to be equal to a value in the vicinity of zero. In the peak current mode control, the reactor current may reach the current command value due to noise being superimposed on the reactor current detected in the vicinity of the zero-crossing point in time of the AC voltage, causing erroneous turn-off in which the drive switch is switched off at an unintentional point in time. The erroneous turn-off of the drive switch becomes a factor in distorting the output current.

The average current mode control controls the average of the reactor current to be equal to the current command value and, therefore, is less affected by the noise superimposed on the reactor current compared with the peak current mode control. Thus, the drive switch may be operated using the average current mode control. The average current mode control, however, has a lower responsivity to the current command value than the peak current mode control. Thus, if the drive switch is operated by the average current mode control in all the time periods in the DC to AC conversion device, the responsivity to the current command value will be decreased.

Given these circumstances, the present disclosure includes a first setting section and a second setting section. The first setting section sets a first duty cycle, which is a percentage of a switch-on time period of the drive switch in one switching cycle, by peak current mode control to control the acquired reactor current to be equal to a current command value generated in accordance with the acquired AC voltage value. The second setting section sets a second duty cycle, which is the percentage of the switch-on time period of the drive switch in one switching cycle, by average current mode control to control an average of the acquired reactor current to be equal to the current command value. The drive switch is operated at the first duty cycle set by the first setting section when an absolute value of the acquired AC voltage value is equal to or more than a predetermined voltage threshold value, and the drive switch is operated at the second duty cycle set by the second setting section when the absolute value of the AC voltage value is less than the voltage threshold value. With this configuration, the drive switch is switched on and off by the peak current mode control in the time period in which the erroneous turn-off is unlikely to occur and by the average current mode control in the time period in which the erroneous turn-off is likely to occur. Thus, the occurrence of erroneous turn-off is inhibited or reduced while inhibiting or reducing the decrease in the responsivity of the reactor current to the current command value, so that the distortion of the output current is inhibited or reduced.

What is claimed is:

1. A controller for a DC to AC conversion device, the controller being applicable to the DC to AC conversion device, which includes a reactor and a drive switch, converts a DC voltage supplied through an input terminal to an AC voltage, and supplies the AC voltage to an AC source connected to an output terminal, the controller comprising:
   a current acquisition section that acquires a reactor current from the reactor, the reactor current being a value of current flowing through the reactor;
   an AC voltage acquisition section that acquires an AC voltage value, the AC voltage value being a voltage value of the AC source;
   a first setting section, the first setting section setting a first duty cycle, which is a percentage of a switch-on time period of the drive switch in one switching cycle, by peak current mode control to control the reactor current acquired from the reactor to be equal to a current command value generated based on the acquired AC voltage value;
   a second setting section, the second setting section setting a second duty cycle, which is the percentage of the switch-on time period of the drive switch in one switching cycle, by average current mode control to control an average of the reactor current acquired from the reactor to be equal to the current command value;
   an operating section that operates the drive switch at the first duty cycle set by the first setting section when an absolute value of the acquired AC voltage value is greater than or equal to a voltage threshold value which is less than an amplitude of the acquired AC voltage value, and operates the drive switch at the second duty cycle set by the second setting section when the absolute value of the acquired AC voltage value is less than the voltage threshold value,
   wherein the operating section switches the drive switch on and off based on a lesser one of the first duty cycle and the second duty cycle in a time period in which the absolute value of the acquired AC voltage value is less than the voltage threshold value; and
   a peak changing section that sets the first duty cycle used by the operating section to be greater than the second duty cycle during the time period in which the absolute value of the acquired AC voltage value is less than the voltage threshold value.

2. The controller for a DC to AC conversion device according to claim 1, wherein
   the peak changing section sets the first duty cycle to be greater than the second duty cycle by setting the current command value used by the first setting section to be greater than the current command value used by the second setting section during the time period in which the absolute value of the acquired AC voltage value is less than the voltage threshold value.

3. The controller for a DC to AC conversion device according to claim 1, wherein
   the peak changing section
   variably sets a mask time that determines a minimum time of the switch-on time period determined based on the first duty cycle, and
   sets the first duty cycle to be greater than the second duty cycle by setting the mask time, in the time period in which the absolute value of the acquired AC voltage value is less than the voltage threshold value, to be longer than the mask time in a time period in which the absolute value of the acquired AC voltage value is greater than or equal to the voltage threshold value.

4. The controller for a DC to AC conversion device according to claim 1, further comprising:
an average changing section that sets the second duty cycle to be greater than the first duty cycle during the time period in which the absolute value of the acquired AC voltage value is greater than or equal to the voltage threshold value.

5. The controller for a DC to AC conversion device according to claim 4, wherein
the average changing section sets the second duty cycle to be greater than the first duty cycle by setting the current command value used by the second setting section to be greater than the current command value used by the first setting section during the time period in which the absolute value of the acquired AC voltage value is greater than or equal to the voltage threshold value.

6. The controller for a DC to AC conversion device according to claim 1, wherein
the voltage threshold value includes the AC voltage in a vicinity of a zero-crossing point in time at which the AC voltage is zero.

7. The controller for a DC to AC conversion device according to claim 1, wherein the reactor is a DC reactor.

* * * * *